United States Patent
Stern

(10) Patent No.: US 6,545,264 B1
(45) Date of Patent: Apr. 8, 2003

(54) SYSTEMS AND METHODS FOR HIGH PERFORMANCE SCANNING

(75) Inventor: David Stern, Mountain View, CA (US)

(73) Assignee: Affymetrix, Inc., Santa Clara, CA (US)

(*) Notice: Subject to any disclaimer, the term of this patent is extended or adjusted under 35 U.S.C. 154(b) by 0 days.

(21) Appl. No.: 09/383,986

(22) Filed: Aug. 26, 1999

Related U.S. Application Data

(60) Provisional application No. 60/106,397, filed on Oct. 30, 1998.

(51) Int. Cl.[7] .................................................. H01J 3/14
(52) U.S. Cl. .................. 250/234; 250/216; 250/458.1; 359/391
(58) Field of Search ................................ 250/234, 235, 250/236, 216, 224, 201.3, 201.4, 458.1, 459.1; 359/391, 393, 368; 356/317, 318

(56) References Cited

U.S. PATENT DOCUMENTS

| | | |
|---|---|---|
| 3,013,467 A | 12/1961 | Minsky |
| 3,849,137 A | 11/1974 | Barzynski et al. |
| 3,862,056 A | 1/1975 | Hartman |
| 3,939,350 A | 2/1976 | Kronick |
| 4,072,576 A | 2/1978 | Arwin et al. |
| 4,180,739 A | 12/1979 | Abu-Shumays |
| 4,238,757 A | 12/1980 | Schenck |
| 4,269,933 A | 5/1981 | Pazos |
| 4,314,821 A | 2/1982 | Rice |
| 4,327,073 A | 4/1982 | Huang |
| 4,339,528 A | 7/1982 | Goldman |
| 4,342,905 A | 8/1982 | Fujii et al. |
| 4,373,071 A | 2/1983 | Itakura |
| 4,405,771 A | 9/1983 | Jagur |
| 4,444,878 A | 4/1984 | Paulus |
| 4,444,892 A | 4/1984 | Malmros |
| 4,448,534 A | 5/1984 | Wertz et al. |

(List continued on next page.)

FOREIGN PATENT DOCUMENTS

| | | |
|---|---|---|
| DE | 3505287 | 9/1985 |
| DE | 03440141 | 5/1986 |
| EP | 063 810 | 11/1982 |

(List continued on next page.)

OTHER PUBLICATIONS

Sequencing by Hybridization Workshop, listing of participants and workshop presentation summaries (1991).
"A Sequencing Reality Check," *Science,* 242:1245 (1988).
"Affymax raises $25 million to develop high–speed drug discovery system," *Biotechnology News,* 10(3):7–8 (1990).
"Preparation of fluorescent–labeled DNA and its use as a probe in molecular hybridization," *Bioorg Khim,* 12(11):1508–1513 (1986).

(List continued on next page.)

*Primary Examiner*—Kevin Pyo
(74) *Attorney, Agent, or Firm*—Banner & Witcoff, Ltd.

(57) ABSTRACT

The present invention provides a scanning confocal microscope image detection system having a simple and inexpensive objective lens and a high acceleration/high speed voice coil driven translation system. The objective lens provides high light collection efficiency at low cost. The voice coil provides improved acceleration for fast scanning of at least one axis (scanning direction; fast scan axis) of a polymer array that can be used effectively with the inexpensive objective lens having high light collection efficiency. In one embodiment the translation stage includes a voice coil, a linear slide, and a light weight bracket connecting the voice coil to the linear slide. The bracket is rigid and designed to support a polymer array to be scanned or a turning prism and objective lens. Thus, the present invention provides systems and methods for high speed low cost scanning of, for example, polymer arrays, i.e., high performance cost effective polymer array scanning using a voice coil driven translation stage.

40 Claims, 4 Drawing Sheets

U.S. PATENT DOCUMENTS

| | | |
|---|---|---|
| 4,458,066 A | 7/1984 | Caruthers et al. |
| 4,483,920 A | 11/1984 | Gillespie et al. |
| 4,500,707 A | 2/1985 | Caruthers et al. |
| 4,516,833 A | 5/1985 | Fusek |
| 4,517,338 A | 5/1985 | Urdea et al. |
| 4,537,861 A | 8/1985 | Elings et al. |
| 4,542,102 A | 9/1985 | Dattagupta et al. |
| 4,555,490 A | 11/1985 | Merril |
| 4,562,157 A | 12/1985 | Lowe et al. |
| 4,569,967 A | 2/1986 | Kornreich et al. |
| 4,580,895 A | 4/1986 | Patel |
| 4,584,277 A | 4/1986 | Ullman |
| 4,613,566 A | 9/1986 | Potter |
| 4,624,915 A | 11/1986 | Schindler et al. |
| 4,626,684 A | 12/1986 | Landa |
| 4,631,211 A | 12/1986 | Houghten |
| 4,637,861 A | 1/1987 | Krull et al. |
| 4,677,054 A | 6/1987 | White et al. |
| 4,681,859 A | 7/1987 | Kramer |
| 4,683,202 A | 7/1987 | Mullis |
| 4,689,405 A | 8/1987 | Frank et al. |
| 4,704,353 A | 11/1987 | Humphries et al. |
| 4,711,955 A | 12/1987 | Ward et al. |
| 4,713,326 A | 12/1987 | Dattagupta et al. |
| 4,713,347 A | 12/1987 | Mitchell et al. |
| 4,719,615 A | 1/1988 | Feyrer et al. |
| 4,722,906 A | 2/1988 | Guire |
| 4,728,502 A | 3/1988 | Hamill |
| 4,728,591 A | 3/1988 | Clark et al. |
| 4,731,325 A | 3/1988 | Palva et al. |
| 4,755,458 A | 7/1988 | Rabbani et al. |
| 4,762,881 A | 8/1988 | Kauer |
| 4,777,019 A | 10/1988 | Dandekar |
| 4,780,504 A | 10/1988 | Buendia et al. |
| 4,786,170 A | 11/1988 | Groebler |
| 4,786,684 A | 11/1988 | Glass |
| 4,794,150 A | 12/1988 | Steel |
| 4,808,508 A | 2/1989 | Platzer |
| 4,810,869 A | 3/1989 | Yabe et al. |
| 4,811,062 A | 3/1989 | Tabata et al. |
| 4,812,512 A | 3/1989 | Buendia et al. |
| 4,820,630 A | 4/1989 | Taub |
| 4,822,566 A | 4/1989 | Newman |
| 4,833,092 A | 5/1989 | Geysen |
| 4,844,617 A | 7/1989 | Kelderman et al. |
| 4,846,552 A | 7/1989 | Veldkamp et al. |
| 4,849,513 A | 7/1989 | Smith et al. |
| 4,855,225 A | 8/1989 | Fung et al. |
| 4,865,990 A | 9/1989 | Stead et al. |
| 4,868,103 A | 9/1989 | Stavrianopoulos et al. |
| 4,874,500 A | 10/1989 | Madou et al. |
| 4,886,741 A | 12/1989 | Schwartz |
| 4,888,278 A | 12/1989 | Singer et al. |
| 4,923,901 A | 5/1990 | Koester et al. |
| 4,925,785 A | 5/1990 | Wang et al. |
| 4,946,942 A | 8/1990 | Fuller et al. |
| 4,973,493 A | 11/1990 | Guire |
| 4,979,959 A | 12/1990 | Guire |
| 4,981,783 A | 1/1991 | Augenlicht |
| 4,981,985 A | 1/1991 | Kaplan et al. |
| 4,984,100 A | 1/1991 | Takayama et al. |
| 4,987,065 A | 1/1991 | Stavrianopoulos et al. |
| 4,988,617 A | 1/1991 | Landegren et al. |
| 4,992,383 A | 2/1991 | Farnsworth |
| 4,994,373 A | 2/1991 | Stavrianopoulos et al. |
| 5,002,867 A | 3/1991 | Macevicz |
| 5,021,550 A | 6/1991 | Zeiger |
| 5,026,773 A | 6/1991 | Steel |
| 5,026,840 A | 6/1991 | Dattagupta et al. |
| 5,028,525 A | 7/1991 | Gray et al. |
| 5,043,265 A | 8/1991 | Tanke et al. |
| 5,047,524 A | 9/1991 | Andrus et al. |
| 5,079,600 A | 1/1992 | Schnur et al. |
| 5,081,584 A | 1/1992 | Omichinski et al. |
| 5,082,830 A | 1/1992 | Brakel et al. |
| 5,091,652 A | 2/1992 | Mathies et al. |
| 5,112,962 A | 5/1992 | Letsinger et al. |
| 5,141,813 A | 8/1992 | Nelson |
| 5,143,854 A | 9/1992 | Pirrung et al. |
| 5,153,319 A | 10/1992 | Caruthers et al. |
| 5,192,980 A | 3/1993 | Dixon et al. |
| 5,200,051 A | 4/1993 | Cozzette et al. |
| 5,202,231 A | 4/1993 | Drmanac et al. |
| 5,206,137 A | 4/1993 | Ip et al. |
| 5,215,882 A | 6/1993 | Bahl et al. |
| 5,215,889 A | 6/1993 | Schultz |
| 5,232,829 A | 8/1993 | Longiaru et al. |
| 5,235,028 A | 8/1993 | Barany et al. |
| 5,242,974 A | 9/1993 | Holmes |
| 5,252,743 A | 10/1993 | Barrett et al. |
| 5,256,549 A | 10/1993 | Urdea et al. |
| 5,258,506 A | 11/1993 | Urdea et al. |
| 5,260,589 A | 11/1993 | Kimura |
| 5,306,641 A | 4/1994 | Saccocio |
| 5,310,893 A | 5/1994 | Erlich et al. |
| 5,324,633 A | 6/1994 | Fodor et al. |
| 5,348,855 A | 9/1994 | Dattagupta et al. |
| 5,384,261 A | 1/1995 | Winkler et al. |
| 5,405,783 A | 4/1995 | Pirrung et al. |
| 5,424,186 A | 6/1995 | Fodor et al. |
| 5,436,327 A | 7/1995 | Southern et al. |
| 5,445,934 A | 8/1995 | Fodor et al. |
| 5,447,841 A | 9/1995 | Gray et al. |
| 5,459,325 A | 10/1995 | Hueton et al. ........... 250/458.1 |
| 5,486,452 A | 1/1996 | Gordon et al. |
| 5,489,507 A | 2/1996 | Chehab |
| 5,489,678 A | 2/1996 | Fodor et al. |
| 5,492,806 A | 2/1996 | Drmanac et al. |
| 5,510,270 A | 4/1996 | Fodor et al. |
| 5,525,464 A | 6/1996 | Drmanac et al. |
| 5,527,681 A | 6/1996 | Holmes |
| 5,552,270 A | 9/1996 | Khrapko et al. |
| 5,556,961 A | 9/1996 | Foote et al. |
| 5,561,071 A | 10/1996 | Hollenberg et al. |
| 5,571,639 A | 11/1996 | Hubbell et al. |
| 5,578,832 A | 11/1996 | Trulson et al. ........... 250/458.1 |
| 5,593,839 A | 1/1997 | Hubbell et al. |
| 5,631,734 A | 5/1997 | Stern et al. ................. 356/317 |
| 5,653,939 A | 8/1997 | Hollis et al. |
| 5,667,667 A | 9/1997 | Southern |
| 5,667,972 A | 9/1997 | Drmanac et al. |
| 5,695,940 A | 12/1997 | Drmanac et al. |
| 5,698,393 A | 12/1997 | Macioszek et al. |
| 5,700,637 A | 12/1997 | Southern |
| 5,707,806 A | 1/1998 | Shuber |
| 5,744,305 A | 4/1998 | Fodor et al. |
| 5,777,888 A | 7/1998 | Rine et al. |
| 5,800,992 A | 9/1998 | Fodor et al. |
| 5,807,522 A | 9/1998 | Brown et al. |
| 5,830,645 A | 11/1998 | Pinkel et al. |
| 5,843,767 A | 12/1998 | Beattie |
| 5,846,708 A | 12/1998 | Hollis et al. |
| 5,871,697 A | 2/1999 | Rothberg et al. |
| 5,880,465 A * | 3/1999 | Boettner et al. ............ 250/234 |
| 5,972,619 A | 10/1999 | Drmanac et al. |
| 5,981,956 A * | 11/1999 | Stern ...................... 250/458.1 |
| 6,018,041 A | 1/2000 | Drmanac et al. |
| 6,025,136 A | 2/2000 | Drmanac et al. |
| 6,193,199 B1 * | 2/2001 | Karam, II ................ 248/276.1 |

FOREIGN PATENT DOCUMENTS

| | | |
|---|---|---|
| EP | 046 083 | 10/1984 |
| EP | 103 197 | 10/1984 |
| EP | 127 438 | 12/1985 |
| EP | 171 150 | 2/1986 |
| EP | 194 132 | 9/1986 |
| EP | 185 547 | 6/1987 |
| EP | 228 075 | 7/1987 |
| EP | 228 310 | 9/1987 |
| EP | 237 362 | 9/1987 |
| EP | 245 662 | 11/1987 |
| EP | 260 634 | 3/1988 |
| EP | 268 237 | 5/1988 |
| EP | 173 339 | 7/1988 |
| EP | 281 927 | 9/1988 |
| EP | 288 310 | 10/1988 |
| EP | 304 202 | 2/1989 |
| EP | 307 476 | 3/1989 |
| EP | 319 012 | 6/1989 |
| EP | 328 256 | 8/1989 |
| EP | 333 561 | 9/1989 |
| EP | 337 498 | 10/1989 |
| EP | 386 229 | 4/1990 |
| EP | 373 203 | 6/1990 |
| EP | 392 546 | 10/1990 |
| EP | 225 807 | 4/1991 |
| EP | 088 636 | 12/1991 |
| EP | 232 967 | 6/1993 |
| EP | 235 726 | 6/1993 |
| EP | 476 014 | 8/1994 |
| EP | 619 321 | 10/1994 |
| EP | 717 113 | 6/1996 |
| EP | 848 067 | 6/1998 |
| FR | 2559783 | 2/1985 |
| GB | 2156074 | 10/1985 |
| GB | 2196476 | 4/1988 |
| GB | 8810400.5 | 5/1988 |
| GB | 2248840 | 4/1992 |
| JP | 49-110601 | 10/1974 |
| JP | 60-248669 | 12/1985 |
| JP | 63-84499 | 4/1988 |
| JP | 63-223557 | 9/1988 |
| JP | 1-233447 | 9/1989 |
| NO | 9103186 | 8/1991 |
| WO | WO 84/03564 | 9/1984 |
| WO | WO 85/01051 | 3/1985 |
| WO | WO 86/00991 | 2/1986 |
| WO | WO 84/03151 | 5/1986 |
| WO | WO 86/06487 | 11/1986 |
| WO | WO 88/04777 | 6/1988 |
| WO | WO 89/05616 | 6/1989 |
| WO | WO 89/08834 | 9/1989 |
| WO | WO 89/10977 | 11/1989 |
| WO | WO 89/11548 | 11/1989 |
| WO | WO 90/00887 | 2/1990 |
| WO | WO 90/03382 | 4/1990 |
| WO | WO 90/04652 | 5/1990 |
| WO | WO 91/04266 | 4/1991 |
| WO | WO 91/07087 | 5/1991 |
| WO | WO 89/12819 | 4/1992 |
| WO | WO 92/10092 | 6/1992 |
| WO | WO 92/10588 | 6/1992 |
| WO | WO 90/15070 | 9/1992 |
| WO | WO 92/16655 | 10/1992 |
| WO | WO 93/02992 | 2/1993 |
| WO | WO 93/09668 | 5/1993 |
| WO | WO 88/01302 | 6/1993 |
| WO | WO 93/11262 | 6/1993 |
| WO | WO 93/22456 | 11/1993 |
| WO | WO 93/22480 | 11/1993 |
| WO | WO 95/11995 | 5/1995 |
| WO | WO 95/33846 | 2/1996 |
| WO | WO 96/23078 | 8/1996 |
| WO | WO 97/17317 | 5/1997 |
| WO | WO 97/27317 | 7/1997 |
| WO | WO 97/29212 | 8/1997 |
| WO | WO 97/19410 | 7/1998 |
| WO | WO 98/31836 | 7/1998 |
| WO | WO 97/10365 | 3/2000 |

OTHER PUBLICATIONS

Abbott et al., "Manipulation of the Wettability of Surfaces on the 0.1—to 1—Micrometer Scale Through Micromachining and Molecular Self–Assembly," *Science,* 257:1380–1382 (1992).

Adams et al., "Complementary DNA Sequencing: Expressed Sequence Tags and Human Genome Project," *Science,* 252(5013):1651–1656 (1991).

Adams et al., "Photolabile Chelators That "Cage" Calcium with Improved Speed of Release and Pre–Photolysis Affinity," *J. Gen. Physiol.,* p. 9a (12/86).

Adams et al., "Biologically Useful Chelators That Take Up $Ca^{2+}$ upon Illumination," *J. Am. Chem. Soc.,* 111:7957–7968 (1989).

Amit et al., "Photosensitive Protecting Groups of Amino Sugars and Their Use in Glycoside Synthesis. 2–Nitrobenzyloxycarbonylamino and 6–Nitroveratryloxycarbonylamino Derivatives," *J.Org.Chem,* 39(2):192–196 (1974).

Amit et al., "Photosensitive Protecting Groups—A Review," *Israel J. Chem.,* 12(1–2):103–113 (1974).

Applied Biosystems, Model 431A Peptide Synthesizer User's manual, Sections 2 and 6, (Aug. 15, 1989).

Ajayaghosh et al., "Solid–Phase Synthesis of N–Methyl– and N–Ethylamides of Peptides Using Photolytically Detachable ((3–Nitro–4((alkylamino)methyl)benzamido)-methyl)polystyrene Resin," *J.Org.Chem.,* 55(9):2826–2829 (1990).

Ajayaghosh et al., "Solid–phase synthesis of C–terminal peptide amides using a photoremovable α–methylphenacylamido anchoring linkage," *Proc. Ind. Natl. Sci (Chem.Sci.),* 100(5):389–396 (1988).

Ajayaghosh et al., "Polymer–supported Solid–phase Synthesis of C–Terminal Peptide N–Methylamides Using a Modified Photoremovable 3–Nitro–4–N–methylaminomethylpolystyrene Support," *Ind.J.Chem.,* 27B:1004–1008 (1988).

Ajayaghosh et al., "Polymer–Supported Synthesis of Protected Peptide Segments on a Photosensitive o–Nitro (α–Methyl)Bromobenzyl Resin," *Tetrahedron,* 44(21):6661–6666 (1988).

Arnold et al., "A Novel Universal Support for DNA & RNA Synthesis," abstract from *Federation Proceedings,* 43(7): abstract No. 3669 (1984).

Atherton et al., Solid Phase Peptide Synthesis: A Practical Approach, IRL Press, (1989), tbl. of cont., pp. vii–ix.

Augenlicht et al., "Cloning and Screening of Sequences Expressed in a Mouse Colon Tumor," *Cancer Research,* 42:1088–1093 (1982).

Augenlicht et al., "Expression of Cloned Sequences in Biopsies of Human Colonic Tissue and in Colonic Carcinoma Cells Induced to Differentiate in Vitro," *Cancer Res.,* 47:6017–6021 (1987).

Bains, W., "Hybridization Methods for DNA Sequencing," *Genomics,* 11(2):294–301 (1991).

Bains et al., "A Novel Method for Nucleic Acid Sequence Determination," *J.Theor.Biol.,* 135:303–307 (1988).

Bains, W., "Alternative Routes Through the Genome," *Biotechnology*, 8:1251–1256 (1988).

Balachander et al., "Functionalized Siloxy–Anchored Monolayers with Exposed Amino, Azido, Bromo, or Cyano Groups," *Tetrahed. Ltrs.*, 29(44):5593–5594 (1988).

Baldwin et al., "New Photolabile Phosphate Protecting Groups," *Tetrahed.*, 46(19):6879–6884 (1990).

Barltrop et al., "Photosensitive Protective Groups," *Chemical Communications*, pp. 822–823 (1966).

Barinaga, M., "Will 'DNA Chip' Speed Genome Initiative," *Science*, 253:1489 (1985).

Bart et al., "Microfabricated Electrohydrodynamic Pumps," *Sensors and Actuators*, A21–A23:193–197 (1990).

Bartsh et al., "Cloning of mRNA sequences from the human colon: Preliminary characterisation of defined mRNAs in normal and neoplastic tissues," *Br.J.Can.*, 54:791–798 (1986).

Baum, R., "Fledgling firm targets drug discovery process," *Chem. Eng. News*, p. 10–11 (1990).

Beltz et al., "Isolation of Multigene Families and Determination of Homologies by Filter Hybridization Methods," *Methods in Enzymology*, 100:266–285 (1983).

Benschop, Chem. Abstracts 114(26):256643 (1991).

Bhatia et al., "New Approach To Producing Patterned Biomolecular Assemblies," *J. American Chemical Society*, 114:4432–4433 (1992).

Biorad Chromatography Electrophoresis Immunochemistry Molecular Biology HPLC catalog M 1987 pp. 182.

Blawas et al., "Step–and–Repeat Photopatterning of Protein Features Using Caged–Biotin–BSA: Characterization and Resolution," *Langmuir*, 14(15):4243–4250 (1998).

Blawas, A.S., "Photopatterning of Protein Features using Caged–biotin–Bovine Serum Albumin," dissertation for Ph.D at Duke University in 1998.

Bos et al., "Amino–acid substirutions at codon 13 of the N–ras oncogene in human acute myeloid leukaemia," *Nature*, 315:726–730 (1985).

Boyle et al., "Differential distribution of long and short interspersed element sequences in the mouse genome: Chromosome karyotyping by fluorescence in situ hybridization," *PNAS*, 87:7757–7761 (1990).

Brock et al., "Rapid fluorescence detection of in situ hybridization with biotinylated bovine herpesvirus–1 DNA probes," *J.Veterinary Diagnostic Invest.*, 1:34–38 (1989).

Burgi et al., "Optimization in Sample Stacking for High–Performance Capillary Electrophoresis," *Anal. Chem.*, 63:2042–2047 (1991).

Cameron et al., "Photogeneration of Organic Bases from o–Nitrobenzyl–Derived Carbamates," *J. Am. Chem. Soc.*, 113:4303–4313 (1991).

Carrano et al., "A High–Resolution, Fluorescence–Based, Semiautomated Method for DNA Fingerprinting," *Genomics*, 4:129–136 (1989).

Caruthers, M.H., "Gene Synthesis Machines: DNA Chemistry and Its Uses," *Science*, 230:281–285 (1985).

Chatterjee et al., "Inducible Alkylation of DNA Using an Oligonucleotide–Quinone Conjugate," *Am. J. Chem. Soc.*, 112:6397–6399 (1990).

Chee et al., "Accessing Genetic Information with High–Density DNA Arrays," *Science*, 274:610–614 (1996).

Chehab et al., "Detection of sicle cell anaemia mutation by colour DNA amplification," *Lancet*, 335:15–17 (1990).

Chehab et al., "Detection of specific DNA sequences by fluorescence amplification: A color complementation assay," *PNAS*, 86:9178–9182 (1989).

Clevite Corp., Piezoelectric Technology, Data for Engineers.

Corbett et al., "Reaction of Nitroso Aromatics with Glyoxylic Acid. A New Path to Hydroxamic Acids," *J. Org. Chem.*, 45:2834–2839 (1980).

Craig et al., "Ordering of cosmid clones covering the Herpes simplex virus type 1 (HSV–1) genome: a test case for fingerprinting by hybridization," *Nuc. Acid. Res.*, 18(9):2653–2660 (1990).

Cummings et al., "Photoactivable Fluorophores. 1. Synthesis and Photoactivation of o–Nitrobenzyl–Quenched Fluorescent Carbamates," *Tetrahederon Letters*, 29(1):65–68 (1988).

Diggelmann, "Investigating the VLSIPS synthesis process," Sep. 9, 1994.

Di Mauro et al., "DNA Technology in Chip Construction," *Adv. Mater.*, 5(5):384–386 (1993).

Drmanac et al., "Partial Sequencing by Oligo–Hybridization Concept and Applications in Genome Analysis," 1st Int. Conf. Electrophor., Supercomp., Hum. Genome pp. 60–74 (1990).

Drmanac et al., "Sequencing by Oligonucleotide Hybridization: A Promising Framework in Decoding of the Genome Program?," 1st Int. Conf. Electrophor., Supercomp., Hum. Genome pp. 47–59 (1990).

Drmanac et al., "Laboratory Methods, Reliable Hybridization of Oligonucleotides as Short as Six Nucleotides," *DNA and Cell Biol.*, 9(7):527–534 (1990).

Drmanac et al., "Sequencing of Megabase Plus DNA by Hybridization: theory of the Method," *Genomics*, 4:114–128 (1989).

Dramanac et al., "Sequencing of Megabase Plus DNA by Hybridization: Theory of the Method," abstract of presentation given at Cold Spring Harbor Symposium on Genome Mapping and Sequencing, Apr. 27, 1988 thru May 1, 1988.

Dulcey et al., "Deep UV Photochemistry of Chemisorbed Monolayers: Patterned Coplanar Molecular Assemblies," *Science*, 252:551–554 (1991).

Duncan et al., "Affinity Chromatography of a Sequence–Specific DNA Binding Protein Using Teflon–Linked Oligonucleotides," *Analytical Biochemistry*, 169:104–108 (1988).

Effenhauser et al., "Glass Chips for High–speed Capillary Electrophoresis Separations with Submicrometer Plate Heights," Anal. Chem., 65:2637–2642 (1993).

Effenhauser et al., "High–Speed Separation of Antisense Oligonucleotides on a Micromachined Capillary Electrophoresis Device," *Anal. Chem.*, 66:2949–2953 (1994).

Ekins et al., "High Specific Activity Chemiluminescent and Fluorescent Markers: their Potential Application to High Sensitivity and 'Multi–analyte' Immunoassays," *J. Bioluminescence Chemiluminescence*, 4:59–78 (1989).

Ekins et al., "Development of Microspot Multi–Analyte Ratiometric Immunoassay Using dual Fluorescent–Labelled Antibodies," *Anal. Chemica Acta*, 227:73–96 (1989).

Ekins et al., "Multianalyte Microspot Immunoassay–Microanalytical 'Compact Disk' of the Future," *Clin. Chem.*, 37(11):1955–1967 (1991).

Ekins, R.P., "Multi–Analyte immunoassay*," *J. Pharmaceut. Biomedical Analysis*, 7(2):155–168 (1989).

Ekins et al., "Fluorescence Spectroscopy and its Application to a New Generation of High Sensitivity, Multi–Microspot, Multianalyte, Immunoassay," *Clin. Chim. Acta,* 194:91–114 (1990).

Evans et al., "Microfabrication for Automation of Molecular processes in Human Genome Analysis," *Clin. Chem.,* 41(11):1681 (1995).

Evans et al., "Physical mapping of complex genomes by cosmid multiplex analysis," *PNAS,* 86:5030–5034 (1989).

Ezaki et al., "Small–Scale DNA Preparation for Rapid Genetic Identification of Campylobacter Species without Radioisotope," *Microbiol. Immunology,* 32(2):141–150 (1988).

Fan et al., "Mapping small DNA sequences by fluorescence in situ hybridization directly on banded metaphase chromosomes," PNAS, 87(16):6223–6227 (1990).

Fan et al., "Micromachining of Capillary Electrophoresis Injectors and Separators on Glass Chips and Evaluation of Flow at Capillary Intersections," Anal. Chem., 66:177–184 (1994).

Fettinger et al., "Stacked modules for micro flow systems in chemical analysis: concept and studies using an enlarged model," *Sensors and Actuators,* B17:19–25 (1993).

Flanders et al., "A new interferometric alignment technique," *App. Phys. Ltrs.,* 31(7):426–429 (1977).

Fodor et al., "Multiplexed biochemical assays with biological chips," *Nature,* 364:555–556 (1993).

Fodor et al., "Light–directed, Spatially Addressable Parallel Chemical Synthesis," *Science,* 251:767–773 (1991).

Forman et al., "Thermodynamics of Duplex Formation and Mismatch Discrimination on Photolithographically Synthesized Oligonucleotide Arrays," chapter 13pp. 206–228 from *Molecular Modeling of Nucleic Acids,* ACS Symposium Series 682, Apr. 13–17, 1997, Leontis et al., eds.

Frank et al., "Simultaneous Multiple Peptide Synthesis Under Continuous flow Conditions on Cellulose Paper Discs as Segmental Solid Supports," *Tetrahedron,* 44(19):6031–6040 (1988).

Frank et al., "Automation of DNA Sequencing Reactions and Related Techniques: A Workstation for Micromanipulation of Liquids," *Bio/Technology,* 6:1211–1212 (1988).

Frank et al., "Simultaneous Synthesis and Biological Applications of DNA Fragments: An Efficient and Complete Methodology," *Methods in Enzymology,* 154:221–250 (1987).

Fuhr et al., "Travelling wave–driven microfabricated electrohydrodynamic pumps for liquids," *J. Micromech. Microeng.,* 4:217–226 (1994).

Fuller et al., "Urethane–Protected Amino N–Carboxy Anhydrides and Their Use in Peptide Synthesis," *J. Amer. Chem. Soc.,* 112(20):7414–7416 (1990).

Furka et al., "General method for rapid synthesis of multi-component peptide mixtures," *Int. J. Peptide Protein Res.,* 37:487–493 (1991).

Furka et al., "Cornucopia of Peptides by Synthesis," 14th Int.Congress of Biochem. abst.#FR:013, Jul. 10–15, 1988 Prague, Czechoslovakia.

Furka et al., "More Peptides by Less Labour," abst. 288, Int. Symp. Med. Chem., Budapest Hungary Aug. 15–19, 1988.

Gait, eds., pp. 1–115 from *Oligonucleotide Synthesis: A Practical Approach,* IRL Press, (1984).

Gazard et al., "Lithographic Technique Using Radiation–Induced Grafting of Acrylic Acid into Poly(Methyl Methacrylate) Films," *Polymer Engineering and Science,* 20(16):1069–1072 (1980).

Gergen et al., "Filter replicas and permanent collections of recombinant DNA plasmids," *Nuc.Acids Res.,* 7(8):2115–2137 (1979).

Getzoff et al., "Mechanisms of Antibody Binding to a Protein," *Science,* 235:1191–1196 (1987).

Geysen et al., "Strategies for epitope analysis using peptide synthesis," *J. Immunol. Meth.,* 102:259–274 (1987).

Geysen et al., "Use of peptide synthesis to probe viral antigens for epitopes to a resolution of a single amino acid," *PNAS,* 81:3998–4002 (1984).

Geysen et al., "A synthetic strategy for epitope mapping," from Peptides:Chem. & Biol., Proc. of 10th Am. Peptide Symp., May 23–28, 1987, pp. 519–523, (1987).

Geysen, "Antigen–antibody interactions at the molecular level: adventures in peptide synthesis," *Immunol. Today,* 6(12):364–369 (1985).

Geysen et al., "Cognitive Features of Continuous Antigenic Determinants," from Synthetic Peptides: Approaches to Biological Probes, pp. 19–30, (1989).

Geysen et al., "Chemistry of Antibody Binding to a Protein," *Science,* 235:1184–1190 (1987).

Geysen et al., "The delineation of peptides able to mimic assembled epitopes," 1986 CIBA Symp., pp. 130–149.

Geysen et al., "Cognitive Features of Continuous Antigenic Determinants," *Mol. Recognit.,* 1(1):1–10 (1988).

Geysen et al., "A Prio Ri Delineation of a Peptide Which Mimics A Discontinuous Antigenic Determinant," *Mol. Immunol.,* 23(7):709–715 (1986).

Gilon et al., "Backbone Cyclization: A New Method for Conferring Conformational Constraint on Peptides," *Biopolymers,* 31(6):745–750 (1991).

Gingeras et al., "Hybridization properties of immobilized nucleic acids," *Nuc. Acids Res.,* 15(13):5373–5390 (87).

Gummerlock et al., "RAS Enzyme–Linked Immunoblot Assay Discriminates p21 Species: A Technique to Dissect Gene Family Expression," *Anal. Biochem.,* 180:158–168 (1989).

Gurney et al., "Activation of a potassium current by rapid photochemically generated step increases of intracellular calcium in rat sympathetic neurons," *PNAS,* 84:3496–3500 (1987).

Haase et al., "Detection of Two Viral Genomes in Single Cells by Double–Label Hybridization in Situ and Color Microradioautography," *Science,* 227:189–192 (1985).

Hacia, et al., "Two color hybridization analysis using high density oligonucleotide arrays and energy transfer dyes," *Nuc. Acids Res.,* 26(16):3865–3866 (1998).

Hack, M.L., "Conics Formed to Make Fluid & Industrial Gas Micromachines," *Genetic Engineering News,* 15(18):1, 29 (1995).

Hagedorn et al., "Pumping of Water Solutions in Microfabricated Electrohydrodynamic Systems," from Micro Electro Mechanical Systems conference in Travemunde Germany (1992).

Hames et al., *Nuclear acid hybridization, a practical approach,* cover page and table of contents (1985).

Hanahan et al., "Plasmid Screening at High Colony Density," *Meth. Enzymology,* 100:333–342 (1983).

Hanahan et al., "Plasmid screening at high colony density," *Gene,* 10:63–67 (1980).

Haridasan et al., "Peptide Synthesis using Photolytically Cleavable 2–Nitrobenzyloxycarbonyl Protecting Group," *Proc. Indian Natn. Sci. Adad.,* 53A(6):717–728 (1987).

Harrison et al., "Capillary Electrophoresis and Sample Injection Systems Integrated on a Planar Glass Chip," *Anal. Chem.,* 64:1926–1932 (1992).

Harrison et al., "Micromachining a Minaturized Capillary Electrophoresis–Based Chemical Analysis System on a Chip," *Science,* 261:895–897 (1993).

Harrison et al., "Towards minaturized electrophoresis and chemical analysis systems on silicon: an alternative to chemical sensors*," *Sensors and Actuators,* B10:107–116 (1993).

Harrison et al., "Rapid separation of fluorescein derivatives using a micromachined capillary electrophoresis system," *Analytica Chemica Acta,* 283:361–366 (1993).

Hellberg et al., "Minimum analogue peptide sets (MAPS) for quantitative structure–activity relationships," *Int. J. Peptide Protein Res.,* 37:414–424 (1991).

Hilser et al., "Protein and peptide mobility in capillary zone electrophoresis, A comparison of existing models and further analysis," *J. Chromatography,* 630:329–336 (1993).

Ho et al., "Highly Stable Biosensor Using an Artificial Enzyme," *Anal.Chem.,* 59:536–537 (1987).

Hochgeschwender et al., "Preferential expression of a defined T–cell receptor β–chain gene in hapten–specific cytotoxic T–cell clones," *Nature,* 322:376–378 (1986).

Hodgson, J., "Assays A La Photolithography," *Biotech.,* 9:419 (1991).

Hopman et al., "Bi–color detection of two target DNAs by non–radioactive in situ hybridization*," *Histochem.,* 85:1–4 (1986).

Iwamura et al., "1–Pyrenylmethyl Esters, Photolabile Protecting Groups for Carboxlic Acids," *Tetrahedron Ltrs.,* 28(6):679–682 (1987).

Iwamura et al., "1–(α–Diazobenzyl)pyrene: A Reagent for Photolabile and Fluorescent Protection of Carboxyl Groups of Amino Acids and Peptides," *Synlett,* p. 35–36 (1991).

Jacobson et al., "Effects of Injection Schemes and Column Geometry on the Performance of Microchip Electrophoresis Devices," Anal. Chem., 66:1107–1113 (1994).

Jacobsen et al., "Open Channel Electrochromatography on a Microchip," Anal. chem., 66:2369–2373 (1994).

Jacobson et al., "Microchip Capillary Electrophoresis with an Integrated Postcolumn Reactor" Anal. Chem., 66:3472–3476 (1994).

Jacobson et al., "Precolumn Reactions with Electrophoretic Analysis Integrated on a Microchip," *Anal. Chem.,* 66:4127–4132 (1994).

Jacobson et al., "Microfabricated chemical measurement systems," *Nature Medicine,* 1(10):1093–1096 (1995).

Jacobsen et al., "Fused Quartz Substrates for Microchip Electrophoresis," *Anal. chem.,* 67:2059–2063 (1995).

Jacobson et al., "High–Speed Separtions on a Microchip," Anal. Chem., 66:1114–1118 (1994).

Jacobson et al., "Microchip electrophoresis with sample stacking," *Electrophoresis,* 16:481–486 (1995).

Jayakumari, "Peptide synthesis in a triphasic medium catalysed by papain immobilized on a crosslinked polystyrene support," *Indian J. Chemistry,* 29B:514–517 (1990).

Kaiser et al., "Peptide and Protein Synthesis by Segment Synthesis–Condensation," *Science,* 243:187–192 (1989).

Kaplan et al., "Photolabile chelators for the rapid photorelease of divalent cations," *PNAS,* 85:6571–6575 (1988).

Karube, "Micro–biosensors based on silicon fabrication technology," chapter 25 from Biosensors:Fundamentals and Applications, Turner et al., eds., Oxford Publ., 1987, pp. 471–480 (1987).

Kates et al., "A Novel, Convenient, Three–dimensional Orthogonal Strategy for Solid–Phase Synthesis of Cyclic Peptides 1–3," *Tetrahed. Letters,* 34(10):1549–1552 (1993).

Kerkof et al., "A Procedure for Making Simultaneous Determinations of the Relative Levels of Gene Transcripts in Tissues or Cells," *Anal. Biochem.,* 188:349–355 (1990).

Khrapko et al., "An Oligonucleotide hybridization approach to DNA sequencing," *FEBS Lett.,* 256(1,2):118–122 (1989).

Kievits et al., "Rapid subchromosomal localization of cosmids by nonradioactive in situ hybridization," *Cytogenetics Cell Genetics,* 53(2–3):134–136 (1990).

Kimura et al., "An Immobilized Enzyme Membrane Fabrication Method using an Ink Jet Nozzle," *Biosensors,* 4:41–52 (1988).

Kimura et al., "An Integrated SOS/FET Multi–Biosensor," *Sensors & Actuators,* 9:373–387 (1986).

Kitazawa et al., "In situ DNA–RNA hybridization using in vivo bromodeoxyuridine–labeled DNA probe," *Histochemistry,* 92:195–199 (1989).

Kleinfeld et al., "Controlled Outgrowth of Dissociated Neurons on Patterned Substrates," *J. Neurosci.,* 8(11):4098–4120 (1988).

Knight, P., "Materials and Methods/Microsequencers for Proteins and Oligosaccharides," *Bio/Tech.,* 7:1075–76 (1989).

Kohara et al., "The Physical Map of the Whole *E. coli* Chromosome: Application of a New Strategy for Rapid Analysis and Sorting of a Large Genomic Library," *Cell,* 50:495–508 (1987).

Krile et al., "Multiplex holography with chirp–modulated binary phase–coded reference–beam masks," *Applied Opt.,* 18(1):52–56 (1979).

Lainer et al., "Human Lymphocyte Subpopulations Identified by Using Three–Color Immunofluorescence and Flow Cytometry Analysis: Correlation of Leu–2, Leu–3, Leu–7, Leu–8, and Leu–11 Clee Surface Antigen Expression," *Journal of Immunology,* 132(1):151–156 (1984).

Lam et al., "A new type of synthetic peptide library for identifying ligand–binding activity," *Nature,* 354:82–84 (1991).

Laskey et al., "Messenger RNA prevalence in sea urchin embryos measured with cloned cDNAs," *PNAS,* 77(9):5317–5321 (1980).

Lee et al., "synthesis of a Polymer Surface Containing Covalently Attached Triethoxysilane Functionality: Adhesion to Glass," *Macromolecules,* 21:3353–3356 (1988).

Lehrach et al., "Labelling oligonucleotides to high specific activity (I)," *Nuc. Acids Res.,* 17(12):4605–4610 (89).

Lehrach et al., "Phage Vectors—EMBL Series," *Meth. Enzymology,* 153:103–115 (1987).

Levy, M.F., "Preparing Additive Printed Circuits," *IBM Tech. Discl. Bull.,* 9(11):1473 (1967).

Lichter et al., "High–Resolution Mapping of Human Chromosome 11 by in Situ hybridization with Cosmid Clones," *Science,* 247:64–69 (1990).

Lichter et al., "Fluorescence in situ hybridization with Alu and L1 polymerase chain reaction probes for rapid characterization of human chromosomes in hybrid cell lines," *PNAS,* 87:6634–6638 (1990).

Lichter et al., "Rapid detection of human chromosome 21 aberrations by in situ hybridization," *PNAS*, 85:9664–9668 (1988).

Lichter et al., "Is non–isotopic in situ hybridization finally coming of age," *Nature*, 345:93–94 (1990).

Lieberman et al., "A Light source Smaller Than the Optical Wavelength," *Science*, 247:59–61 (1990).

Lipshutz et al., "Using Oligonucleotide Probe Arrays To Access Genetic Diversity," *BioTech.*, 19(3):442–7 (1995).

Liu et al., "Sequential Injection Analysis in Capillary Format with an Electroosmotic Pump," *Talanta*, 41(11):1903–1910 (1994).

Lockhart et al., "Expression monitoring by hybridization to high–density oligonucleotide arrays," *Nat. Biotech.*, 14:1675–1680 (1996).

Logue et al., "General Approaches to Mask Design for Binary Optics," SPIE, 1052:19–24 (1989).

Loken et al., "three–color Immunofluorescence Analysis of Leu Antigens on Human Peripheral Blood Using Two Lasers on a Fluorescence–Activated Cell Sorter," *Cymoetry*, 5:151–158 (1984).

Love et al., "Screening of λ Library for Differentially Expressed Genes Using in Vitro Transcripts," *Anal. Biochem.*, 150:429–441 (1985).

Lowe, C.R., "Biosensors," *Trends in Biotech.*, 2:59–65 (1984).

Lowe, C.R., "An Introduction to the Concepts and Technology of Biosensors," *Biosensors*, 1:3–16 (1985).

Lowe, C. R., Biotechnology and Crop Improvement and Protection, BCPC Publications, pp. 131–138 (1986).

Lowe et al., "Solid–Phase Optoelectronic Biosensors," *Methods in Enzymology*, 137:338–347 (1988).

Lowe, C.R., "Biosensors," *Phil. Tran. R. Soc. Lond.*, 324:487–496 (1989).

Lu et al., "Differential screening of murine ascites cDNA libraries by means of in vitro transcripts of cell–cycle–phase–specific cDNA and digital image processing," *Gene*, 86:185–192 (1990).

Lysov et al., "A new method for determining the DNA nucleotide sequence by hybridization with oligonucleotides," *Doklady Biochem.*, 303(1–6):436–438 (1989).

Lysov et al., "DNA Sequencing by Oligonucleotide Hybridization," First International Conference on Electrophoresis, Supercomputing and the Human Genome, Apr. 10–13, 1990 p. 157.

MacDonald et al., "A Rapid ELISA for Measuring Insulin in a Large Number of Research Samples," *Metabolism*, 38(5):450–452 (1989).

Mairanovsky, V.G., "Electro–Deprotection– Electrochemical Removal of Protecting Groups**," *Agnew. Chem. Int. Ed. Engl.*, 15(5):281–292 (1976).

Manz et al., "Miniaturized Total Chemical Analysis Systems: a Novel Concept for Chemical Sensing," *Sensors and Actuators*, B1:244–248 (1990).

Manz et al., "Micromachining of monocrystalline silicon and glass for chemical analysis systems, A look into next century's technology or just a fashionable craze?," *Trends in Analytical Chem.*, 10(5):144–149 (1991).

Manz et al., "Planar chips technology for minaturization and integration of separation techniques into monitoring systems, Capillary electrophoresis on a chip," *J. Chromatography*, 593:253–258 (1992).

Manz et al., "Planar Chips Technology for Miniaturization of Separation Systems: A Developing Perspective in Chemical Monitoring," chapter 1, 1–64 (1993).

Manz et al., "Electroosmotic pumping and electrophoretic separations for minaturized chemical analysis systems," *J. Micromech. Microeng.*, 4:257–265 (1994).

Masiakowski et al., "Cloning of cDNA sequences of hormone–regulated genes from the MCF–7 human breast cancer cell line," *Nuc. Acids Res.*, 10(24):7895–7903 (1982).

Matsumoto et al., "Preliminary Investigation of Micropumping Based on Electrical Control of Interfacial Tension," *IEEE*, pp. 105–110 (1990).

Matsuzawa et al., "Containment and growth of neuroblastoma cells on chemically patterned substrates," *J. Neurosci. Meth.*, 50:253–260 (1993).

McCray et al., "Properties and Uses of Photoreactive Caged Compounds," *Ann. Rev. Biophys. Biophys. Chem.*, 18:239–270 (1989).

McGall et al., "The Efficiency of Light–Directed Synthesis of DNA Arrays on Glass Substrates," *J. American Chem. Soc.*, 119(22):5081–5090 (1997).

McGillis, VLSI Technology, Sze, eds., Chapter 7, "Lithography," pp. 267–301 (1983).

McMurray, J.S., "Solid Phase Synthesis of a Cyclic Peptide Using Fmoc Chemistry," *Tetrahedron Letters*, 32(52):7679–7682 (1991).

Meinkoth et al., "Review: Hybridization of Nucleic Acids Immobilized on solid Supports," *Analytical Biochem.*, 138:267–284 (1984).

Melcher et al., "Traveling–Wave Bulk Electroconvection Induced across a Temperature Gradient," *Physics of Fluids*, 10(6):1178–1185 (1967).

Merrifield, R.B., "Solid Phase peptide Synthesis. I. The Synthesis of a Tetrapeptide," *J.Am.Chem.Soc.*, 85:2149–2154 (1963).

Michiels et al., "Molecular approaches to genome analysis: a strategy for the construction of ordered overlapping clone libraries," *CABIOS*, 3(3):203–10 (1987).

Mirzabekov, A.D., "DNA sequencing by hybridization—a megasequencing method and a diagnostic tool?," *TIBTECH*, 12:27–32 (1994).

Monaco et al., "Human Genome Linking with Cosmids and Yeast Artificial Chromosomes", abstract from CSHS, p. 50, (1989).

Morita et al., "Direct pattern fabrication on silicone resin by vapor phase electron beam polymerization," *J.Vac.Sci.Technol.*, B1(4):1171–1173 (1983).

Morrison et al., "Solution–Phase Detection of Polynucleotides Using Interacting Fluorescent Labels and Competitive Hybridization," *Anal. Biochem.*, 183:231–244 (1989).

Munegumi et al., "thermal Synthesis of Polypeptides from N–Boc–Amino Acid (Aspartic Acid, β–Aminoglutaric Acid) Anhydrides," *Chem. Letters*, pp. 1643–1646 (1988).

Mutter et al., "Impact of Conformation on the Synthetic Strategies for Peptide Sequences," pp. 217–228 from Chemistry of Peptides and Proteins, vol. 1, Proceedings of the Third USSR–FRG Symp., in USSR (1982).

Nakamori et al., "A Simple and Useful Method for Simultaneous Screening of Elevated Levels of Expression of a Variety of Oncogenes in Malignant Cells," *Jpn. J. Cancer Res.*, 79:1311–1317 (1988).

Nederlof et al., "Multiple Fluorescence In Situ Hybridization," *Cytometry*, 11:126–131 (1990).

Nyborg, W., "Acoustic Streaming," chapter 11 pp. 265–329 from Physical Acoustics, Principles and Methods, Mason, eds., vol. II, part B, Academic Press, New York and London (1965).

Ocvirk et al., "High Performance Liquid Chromatography Partially Integrated onto a Silicon Chip," *Analyt. Meth. Instrumentation,* 2(2):74–82 (1995).

Ohtsuka et al., "Studies on transfer ribonucleic acids and related compounds. IX Ribonucleic oligonucleotide synthesis using a photosensitive 0–nitrobenzyl protection at the 2'–hydroxl group," *Nuc.Acids.Res.,* 1(10):1351–1357 (1974).

Olefirowicz et al., "Capillary Electrophoresis for Sampling Single Nerve Cells," *Chimia,* 45(4):106–108 (1991).

Pease et al., "Light–generated oligonucleotide arrays for rapid DNA sequence analysis," *PNAS,* 91:5022–26 (1994).

Pevzner, P.A., "1–Tuple DNA Sequencing: Computer Analysis," *J. Biomol. Struct. Dynam.,* 7(1):63–69 (1989).

Pfahler et al., "Liquid Transport in Micron and Submicron Channels," *Sensors and Actuators,* A21–A23:431–4 (90).

Pidgeon et al., "Immobilized Artificial Membrane Chromatography: Supports Composed of Membrane Lipids," *Anal. Biochem.,* 176:36–47 (89).

Pillai, V.N., "Photoremovable Protecting Groups in Organic Synthesis," *Synthesis,* pp. 1–26 (1980).

Pillai et al., "3–Nitro–4–Aminomethylbenzoylderivate von Polyethylenglykolen: Eine neue Klasse von Photosensitiven loshlichen Polymeren Tragern zur Synthese von C–terminalen Peptidamiden," *Tetrah. ltr., #36 p. 3409–3412 (1979).

Pillai et al., "Synthetic Hydrophilic Polymers, Biomedical and Chemical Applications," *Naturwissenschaften,* 68:558–566 (1981).

Pirrung et al., "Proofing of Photolithographic DNA Synthesis with 3'.5'–Dimethoxybenzoinyloxycarbonyl–Protected Deoxynucleoside Phosphoramidites," *J. Org. Chem.,* 63(2):241–246 (1998).

Pirrung et al., "Comparison of Methods for Photochemical Phosphoramidite–Based DNA Synthesis," *J. Org. Chem.,* 60:6270–6276 (1995).

Ploax et al., "Cyclization of peptides on a solid support," *Int. J. Peptide Protein Research,* 29:162–169 (1987).

Polsky–Cynkin et al., "Use of DNA Immobilized on Plastic and Agarose Supports to Detect DNA by Sandwich Hybridization," *Clin. Chem.,* 31(9):1428–1443 (1985).

Poustka et al., "Molecular Approaches to Mammalian Genetics," Cold Spring Harbor Symposia on Quantitive Biology, 51:131–139 (1986).

Purushothaman et al., "Synthesis of 4,5–diarylimidazoline–2–thiones and their photoconversion to bis(4,5–diarylimidazol–2–yl) sulphides," *Ind. J. Chem.,* 29B:18–21 (1990).

Quesada et al., "High–Sensitivity DNA Detection with a Laser–Exited Confocal Fluorescence Gel Scanner," *Biotechniques,* 10:616 (1991).

Reichmanis et al., *J. Polymer Sci. Polymer Chem. Edition,* 23:1–8 (1985).

Richter et al., "An Electrohydrodynamic Micropump," *IEEE,* pp. 99–104 (1990).

Richter et al., "Electrohydrodynamic Pumping and Flow Measurement," *IEEE,* pp. 271–276 (1991).

Richter et al., "A Micromachined electrohydrodynamic (EHD) pump," *Sensors and Actuators,* A29:159–168 (91).

Robertson et al., "A General and Efficient Route for Chemical Aminoacylation of Transfer RNAs," *J. Am. Chem. Soc.,* 113:2722–2729 (1991).

Rodda et al., "The Antibody Response to Myoglobin–I. Systematic Synthesis of Myglobin Peptides Reveals Location and Substructure of Species–Dependent Continuous Antigenic Determinants," *Mol. Immunol.,* 23(6):603–610 (1986).

Rodgers, R.P., "Data Processing of Immunoassay Results," Manual of Clin. Lab. Immunol., 3rd ed., ch. 15, pp. 82–87 (1986).

Rose, D.J., "Free–solution reactor for post–column fluorescence detection in capillary zone electrophoresis," *J. Chromatography,* 540:343–353 (1991).

Rovero et al., "Synthesis of Cylic Peptides on solid Support," *Tetrahed. Letters,* 32(23):2639–2642 (1991).

Saiki et al., "Genetic analysis of amplified DNA with immobilized sequence–specific oligonucleotide probes," *PNAS,* 86:6230–6234 (1989).

Saiki et al., "Analysis of enzymatically amplified β–globin and HLA–DQα DNA with Allele–specific oligonucleotide probes," *Nature,* 324:163–166 (1986).

Scharf et al., "HLA class II allelic variation and susceptibility to *pemphigus vulgaris,*" *PNAS,* 85(10):3504–3508 (1988).

Schuup et al., "Mechanistic Studies of the Photorearrangement of o–Nitrobenzyl Esters," *J. Photochem.,* 36:85–97 (1987).

Seiler et al., "Planar Glass Chips for Capillary Electrophoresis: Repetitive Sample Injection, Quantitation, and Separation Efficency," *Anal. Chem.,* 65:1481–1488 (1993).

Seller et al., "Electroosmotic Pumping and Valveless Control of Fluid Flow within a Manifold of Capillaries on a Glass Chip," Anal. Chem., 66:3485–3491 (1994).

Semmelhack et al., "Selective Removal of Protecting Groups Using Controlled Potential Electrolysis," *J. Am. Chem. Society,* 94(14):5139–5140 (1972).

Sheldon et al., "Matrix DNA Hybridization," *Clinical Chemistry,* 39(4):718–719 (1993).

Shin et al., "Dehydrooligonpeptides. XI. Facile Synthesis of Various Kinds of Dehydrodi– and tripeptides, and Dehydroenkephalins Containing Tyr Residue by Using N–Carboxydehydrotyrosine Anhydride," *Bull. Chem. Soc. Jpn.,* 62:1127–1135 (1989).

Sim et al., "Use of a cDNA Library for Studies on Evolution and Developmental Expression of the Chorion Multigene Families," *Cell,* 18:1303–1316 (1979).

Smith et al., "A Novel Method for Delineating Antigenic Determinants: Peptide Synthesis and Radioimmunoassay Using the Same Solid Support," *Immunochemistry,* 14:565–568 (1977).

Southern et al., "Report on the Sequencing by Hybridization Workshop," *Genomics,* 13:1378–1383 (1992).

Southern et al., "Oligonucleotide hybridisations on glass supports: a novel linker for oligonucleotide synthesis and hybridization properties of oligonucleotides synthesized in situ," *Nuc. Acids Res.,* 20(7):1679–1684 (1992).

Southern et al., "Analyzing and Comparing Nucleic Acid Sequences by Hybridization to Arrays of Oligonucleotides: Evaluation Using Experimental Models," Genomics, 13:1008–10017 (1992).

Stemme et al., "A valveless diffuser/nozzle–based fluid pump," *Sensors and Actuators,* A39:159–167 (1993).

Stryer, L., "DNA Probes and Genes Can be Synthesized by Automated Solid–Phase Methods," from *Biochemistry*, Third Edition, published by W.H. Freeman & Co., (1988).

Stuber et al., "Synthesis and photolytic cleavage of bovine insulin B22–30 on a nitrobenzoylglycyl–poly (ethylene glycol) support," *Int. J. Peptide Protein Res.*, 22(3):277–283 (1984).

Sundberg et al., "Spatially–Addressable Immobilization of Macromolecules on Solid Supports," *J. Am. Chem. Soc.*, 117(49):12050–12057 (1995).

Swedberg, S.A., "Use of non–ionic and zwitterionic surfactants to enhance selectivity in high–performance capillary electrophoresis, An apparent micellar electrokinetic capillary chromatography mechanism," *J. Chromatography*, 503:449–452 (1990).

Titus et al., "Texas Red, a Hydrophilic, red–emitting fluorophore for use with fluorescein in dual parameter plow microfluorometric and fluorescence microscopic studies," *J. Immunol. Meth.*, 50:193–204 (1982).

Tkachuk et al., "Detection of bcr–abl Fusion in chronic Myelogeneous Leukemia by in situ Hybridization," *Science*, 250:559–562 (90).

Trzeciak et al., "Synthesis of 'Head–to–Tail' Cyclized Peptides on Solid Support by FMOC Chemistry," *Tetrahed. Letters*, 33(32):4557–4560 (1992).

Tsien et al., "Control of Cytoplasmic Calcium with Photolabile Tetracarboxylate 2–Nitrobenzhydrol Chelators," *Biophys. J.*, 50:843–853 (1986).

Tsutsumi et al., "Expression of L– and M– Type Pyruvate Kinase in Human Tissues," *Genomics*, 2:86–89 (1988).

Turchinskii et al., "Multiple Hybridization in Genome Analysis, Reaction of Diamines and Bisulfate with Cytosine for Introduction of Nonradioactive labels Into DNA," *Molecular Biology*, 22:1229–1235 (1988).

Turner et al., "Photochemical Activation of Acylated α–Thrombin," *J. Am. Chem. Soc.*, 109:1274–1275 (1987).

Urdea et al., "A novel method for the rapid detection of specific nucleotide sequences in crude biological samples without blotting or radioactivity; application to the analysis of hepatitis B virus in human serum," *Gene*, 61:253–264 (1987).

Urdea et al., "A comparison of non–radioisotopic hybridization assay methods using fluorescent, chemiluminescent and enzyme labeled synthetic oligodeoxyribonucleotide probes," *Nuc. Acids Res.*, 16(11):4937–4956 (1988).

Van der Voort et al., "Design and Use of a Computer Controlled Confocal Microscope for Biological Applications," *Scanning*, 7(2):66–78 (1985).

Van Hijfte et al., "Intramolecular 1,3–Diyl Trapping Reactions. A Formal Total Synthesis of –Coriolin," J. Organic Chemistry, 50:3942–3944 (1985).

Veldkamp, W.B., "Binary optics: the optics technology of the 1990s," CLEO 90, vol. 7, paper #CMG6 (1990).

Verlaan–de Vries et al., "A dot–blot screening procedure for mutated ras oncogenes using synthetic oligodeoxynucleotides," *Gene*, 50:313–320 (1986).

Verpoorte et al., "Three–dimensional micro flow manifolds for miniaturized chemical analysis systems," *J. Micromech. Microeng.*, 4:246–256 (1994).

Volkmuth et al., "DNA electrophoresis in microlithographic arrays," *Nature*, 358:600–602 (1992).

Voss et al., "The immobilization of oligonucleotides and their hybridization properties," *Biochem. Soc. Transact.*, 16:216–217 (1988).

Walker et al., "Photolabile Protecting Groups for an Acetylcholine Receptor Ligand. Synthesis and Photochemistry of a New Class of o–Nitrobenzyl Derivatives and their Effects on Receptor Function," *Biochemistry*, 25:1799–1805 (1986).

Wallace et al., "Hybridization of synthetic oligodeoxyribonucleotides to $\Phi_x$ 174 DNA: the effect of single base pair mismatch," *Nuc. Acids Res.*, 11(6):3543–3557 (1979).

Washizu et al., "Handling Biological Cells Using a Fluid Integrated Circuit," *IEEE Transactions Industry Applications*, 26(2):352–358 (1990).

Werner et al., "Size–Dependent Separation of Proteins Denatured in SDS by Capillary Electrophoresis Using a Replaceable Sieving Matrix," *Anal. Biochem.*, 212:253–258 (1993).

White et al., "An Evaluation of Confocal Versus Conventional Imaging of Biological Structures by Fluorescence Light Microscopy," *J. Cell Biol.*, 105(1):41–48 (1987).

Widacki et al., "Biochemical Differences in Qa–2 Antigens Expressed by Qa–2+,6+ and Qa–2a+,6–Strains. Evidence for Differential Expression of the Q7 and Q9 Genes," *Mol. Immunology*, 27(6):559–570 (1990).

Wilcox et al., "Synthesis of Photolabile 'Precursors' of Amino Acid Neurotransmitters," *J. Org. Chem.*, 55:1585–1589 (1990).

Wilding et al., "PCR in a Silicon Microstructure," *Clin. Chem.*, 40(9):1815–1818 (1994).

Wilding et al., "Manipulation and Flow of Biological Fluids in Straight Channels Micromachined in Silicon," *Clin. Chem.*, 49(1):43–47 (1994).

Wittman–Liebold, eds., Methods in Protein Sequence Analysis, from Proceedings of 7th Int'l Conf., Berlin, Germany, Jul. 3–8, 1988, table of contents, pp. xi–xx* (1989).

Woolley et al., "Ultra–high–speed DNA fragment separations using microfabricated capillary array electrophoresis chips," *PNAS*, 91:11348–11352 (1994).

Wu et al., "Synthesis and Properties of Adenosine–5'–triphosphoro–γ–5–(5–sulfonic acid)naphthyl Ethylamidate: A Fluorescent Nucleotide Substrate for DNA–Dependent RNA Polymerase from *Escherichia coli*," *Arch. Biochem. Biophys.*, 246(2):564–571 (1986).

Wu et al., "Laboratory Methods, Direct Analysis of Single Nucleotide Variation in Human DNA and RNA Using In Situ Dot Hybridization," *DNA*, 8(2):135–142 (1989).

Yamamoto et al., "Features and applications of the laser scanning microscope," *J. Mod. Optics*, 37(11):1691–1701 (1990).

Yarbrough et al., "Synthesis and Properties of Fluorescent Nucleotide Substrates for DNA–dependent RNA Polymerases," *J. Biol. Chem.*, 254(23):12069–12073 (1979).

Yosomiya et al., "Performance, Glass fiber Having Isocyanate Group on the Surface. Preparation and Reaction with Amino Acid," *Polymer Bulletin*, 12:41–48 (1984).

Young, W.S.,"Simultaneous Use of Digoxigenin– and Radiolabeled Oligodeoxyribonucleotide Probes for Hybridization Histochemistry," *Neuropeptides*, 13:271–275 (1989).

Yue et al., "Miniature Field–Flow Fractionation System for Analysis of Blood Cells," *Clin. Chem.*, 40(9):1810–1814 (1994).

Zehavi et al., "Light–Sensitive Glycosides. I. 6–Nitroveratryl β–D–Glucopyranoside and 2–Nitrobenzyl β–D–Glucopyranoside," *J. Org. Chem.*, 37(14):2281–2285 (1972).

Zengerle et al., "Transient measurements on miniaturized diaphragm pumps in microfluid systems," *Sensors and Actuators,* A46–47:557–561 (1995).

International Search Report dated Aug. 4, 2000, U.S. Searching Authority, Application No. PCT/US99/29351.

Marvin Minsky, "Memoir on Inventing the Confocal Scanning Microscope," taken from (www.ai.mit.edu/people/minsky/papers/confocal.microscope.txt), Jun. 14, 1999, p. 1–6.

* cited by examiner

DIRECTION OF MOTION X
(FAST AXIS)

DIRECTION OF MOTION Y
(SLOW AXIS)

DIRECTION OF MOTION Z
(FOCUS AXIS)

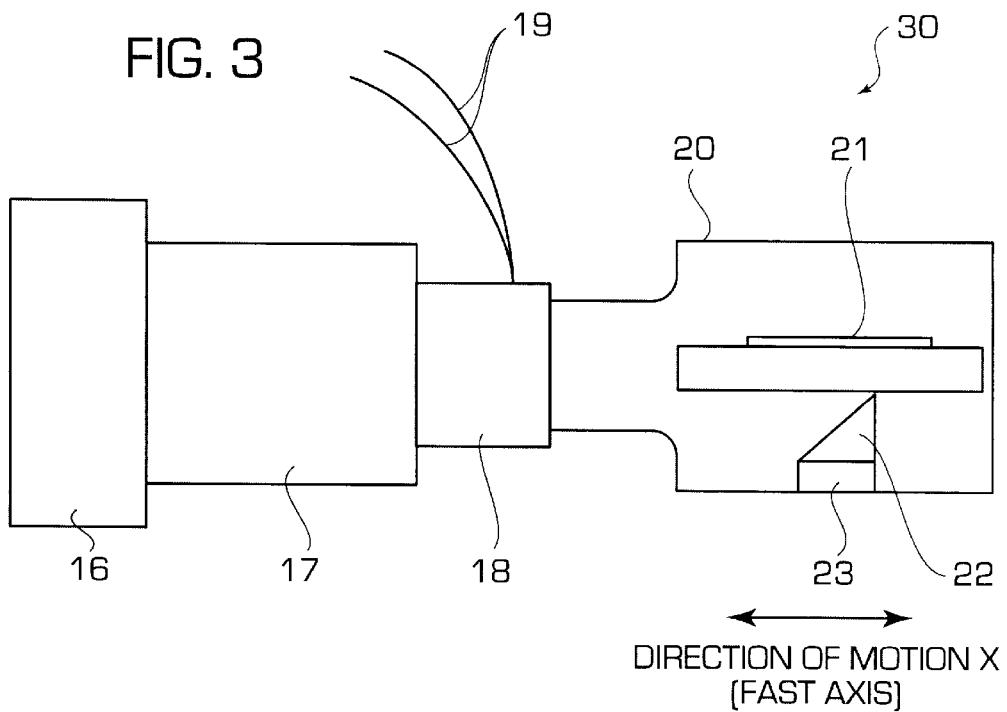
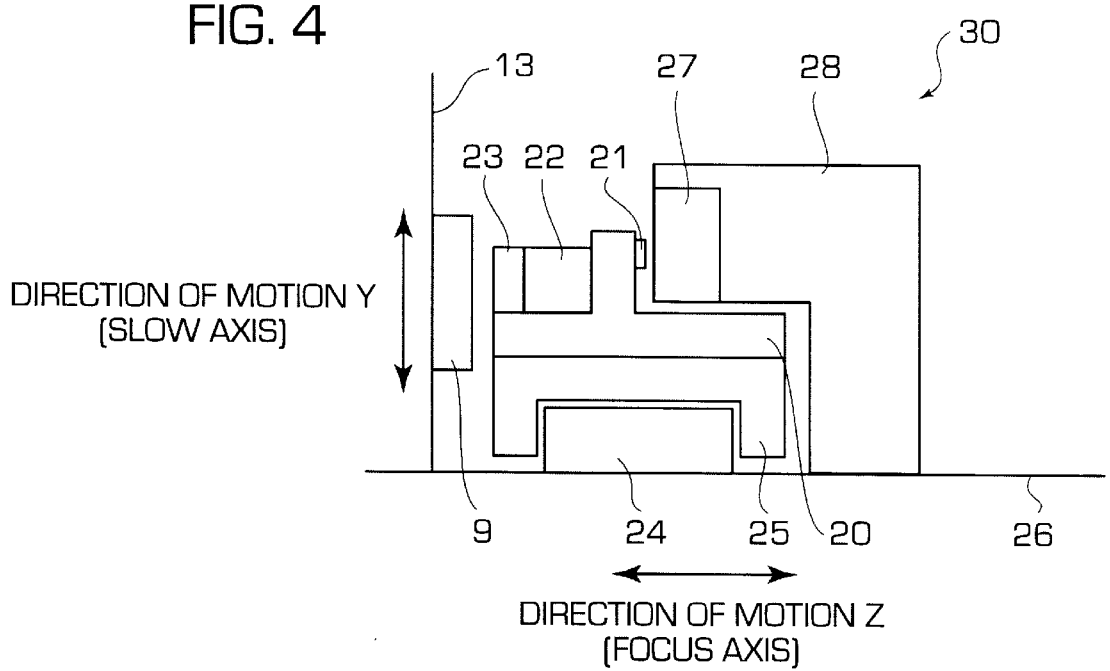

SYSTEMS AND METHODS FOR HIGH PERFORMANCE SCANNING

The present application relates to provisional U.S. patent application Ser. No. 60/106,397, filed Oct. 30, 1998, the complete disclosure of which is hereby incorporated herein by reference for all purposes.

GOVERNMENT RIGHTS NOTICE

Portions of the material in this specification arose as a result of Government support under contract number 70NANBG5H1031 between Affymetrix and the U.S. Department of Commerce. The Government has certain rights in this invention.

BACKGROUND OF THE INVENTION

1. Technical Field of the Invention

The present invention generally relates to the fields of imaging and scanning. In particular, the present invention provides scanning systems and methods for high speed scanning and imaging of a sample containing labeled materials, for example scanning arrays of polymer sequences such as oligonucleotide arrays.

2. Description of the Related Art

Polymer arrays, for example, DNA arrays, are known as shown in patent application U.S. Ser. No. 08/811,829 ('829) and U.S. Pat. Nos. 5,744,305; 5,445,936; and 5,677,195; which are hereby incorporated by reference in their entirety for all purposes. The polymer arrays, such as the GeneChip® probe array (Affymetrix, Inc., Santa Clara, Calif.), can be synthesized using light-directed methods described, for example, in U.S. Pat. Nos. 5,143,854; 5,424,186; 5,510,270; and PCT published application no. WO 95/11995, which are hereby incorporated by reference in their entirety for all purposes. In one method, an array containing synthesized single stranded nucleic acids such as DNA, is enclosed in a protective package, as shown in patent applications U.S. Ser. Nos. 08/528,173 and 08/485,452 which are hereby incorporated by reference in their entireties for all purposes. The array is contacted with a sample containing single stranded DNA that is labeled using for example fluorescent labels such as fluorescein or phycoerythrin, and which hybridizes to the single stranded DNA on the array. After hybridization, the array (either packaged or not packaged) is placed into a device generally known as a scanner that obtains a fluorescence image of the array in order to analyze hybridization between the single stranded nucleic acids on the array and in the sample.

Systems (scanners) and methods for detecting marked targets on polymer arrays are generally known. Typically the polymer array is scanned using a scanner that directs a point of light in a rectilinear raster fashion so as to image the entire polymer array. A scanner may include a confocal microscope with a light source for generating light directed to the polymer array, a photodetection mechanism for detecting light emitted from the polymer array, and a computer controlled translation table that moves the polymer array in three (XYZ) directions. One direction is the fast scan direction (e.g., X direction), another is the slow scan direction (e.g., Y direction) and the third direction is a focus direction (e.g., Z direction).

As an example, the scanner projects a point of light onto a surface of the polymer array and is focused by the translation stage in the focus direction; Z direction. Next, the translation stage rectilinearly fast scans the point of light from one side of the polymer array to another by moving the polymer array in for example the X direction, so as to scan one line of the polymer array, point by point. During the fast scan the photodetection mechanism detects the light emitted from the surface of the polymer array so as to obtain a fluorescence image of the polymer array. Once one line in the fast scan (X) direction has been scanned the translation table moves the polymer array incrementally approximately the thickness of one scan line in the slow scan (Y) direction. This raster scanning continues until the entire surface area of the polymer array has been scanned. (See for example U.S. Pat. No. 5,631,734 issued to Stern et al., which is hereby incorporated by reference in its entirety for all purposes.)

There is a need for a polymer array scanner which is reasonable in cost and provides high polymer array scanning throughput and high resolution, e.g. 1.5 $\mu$m 3.5 $\mu$m, or smaller pixel size over a 14 mm×14 mm field.

SUMMARY OF THE INVENTION

The present invention provides systems and methods for image scanning of, for example, polymer arrays. The invention provides means for moving a linear translation stage of a scanning system with a speed of at least 10 scanning lines/second, preferably at least 20 scanning lines/second and more preferably at least 30 scanning lines/second over a scanning distance of at least 2 mm, preferably at least 5 mm, and more preferably at least 14 mm. The scanning system is capable of scanning with pixels having a size of approximately 3.5 $\mu$m or less, preferably having a size of approximately 2 $\mu$m or less, and more preferably having a size of approximately 1.5 $\mu$m or less, while maintaining the fast scanning speeds indicated above and accurately detecting an image. In some embodiments, the scanner includes a voice coil to provide scanning motion for at least one of the X direction, Y direction, and Z direction translation of a polymer array analysis system. The acceleration of the voice-coil-driven axis of the present invention is high (e.g., 13.7 G, where G is the acceleration due to gravity) and can not easily be achieved with stepping motors. The high acceleration, combined with the high steady-state scan speed of the voice-coil-driven axis (about 22 inches/second), enables the voice coil scanner of the present invention to scan a distance of, for example, 14 mm (length of scan line of one type of polymer array) at 30 lines/second.

The voice coil scanner of the present invention can use either stationary optics or a moving scan head. In either case, the voice-coil-driven axis is the X axis. In one embodiment, the voice coil drives a lightweight linear slide mounted on a 2-axis (YZ) translation table. This linear slide serves as the support for a polymer array (scanned sample). In another embodiment, the voice coil drives a scan head, i.e. a lightweight linear slide that supports a turning prism or turning mirror and an objective lens, while the polymer array is supported by the 2-axis (YZ) translation table. Further, a motion control system is provided to monitor and control the motion of the voice coil for fast accurate scanning of the polymer array.

Using a voice coil for high speed scanning of polymer arrays in the fast axis (X) direction, rather than using a galvanometer driven scanning mirror, enables the use of a simple low cost objective lens having a high numerical aperture (for example, 0.5 or greater). The objective lens can be, for example, a microscope objective lens or a single element aspheric lens. This objective lens can have high numerical aperture while being small and inexpensive because it does not have to be corrected for off-axis aberrations, unlike the objective lens in a galvo scanner. All other things being equal (laser power, spot size, etc.), a scanner with an objective numerical aperture of 0.5 operating at 30 lines/second produces images with the same signal-to-noise ratio as a scanner with an objective numerical aperture of 0.25 operating at 7.5 lines/second.

As a result of using the combination of a voice coil driven translation stage and a simple high efficiency objective lens, the voice coil scanner of the present invention can achieve fast scanning and high polymer array throughput. For example, the voice coil scanning system of the present invention, with an objective lens having a numerical aperture of 0.5 or greater, can achieve accurate and reliable polymer array scanning at a speed of at least 10 lines/second, preferably at least 20 lines/second and more preferably at least 30 lines/second.

Therefore, the present invention provides a scanning system with a simple and inexpensive objective lens and a high acceleration/high speed voice coil driven translation stage that can rapidly scan, for example, 12.8 mm×12.8 mm polymer arrays using a pixel size of, for example, about 3.5 $\mu$m or smaller, more preferably 2 $\mu$m or smaller and most preferably 1.5 $\mu$m or smaller. The voice coil provides improved acceleration for fast scanning of at least one axis of a polymer array. As a result, the present invention provides systems and methods for accurate, high speed, low cost scanning of polymer arrays, i.e., high performance cost effective polymer array scanning.

BRIEF DESCRIPTION OF THE DRAWINGS

FIG. 3 is a top view of another embodiment of a voice-coil-driven translation stage for the scanning system according to the present invention.

FIG. 4 is an end view of another embodiment of a voice-coil-driven translation stage and an encoder readhead for the scanning system according to the present invention.

DESCRIPTION OF THE PREFERRED EMBODIMENTS

Figure 1:
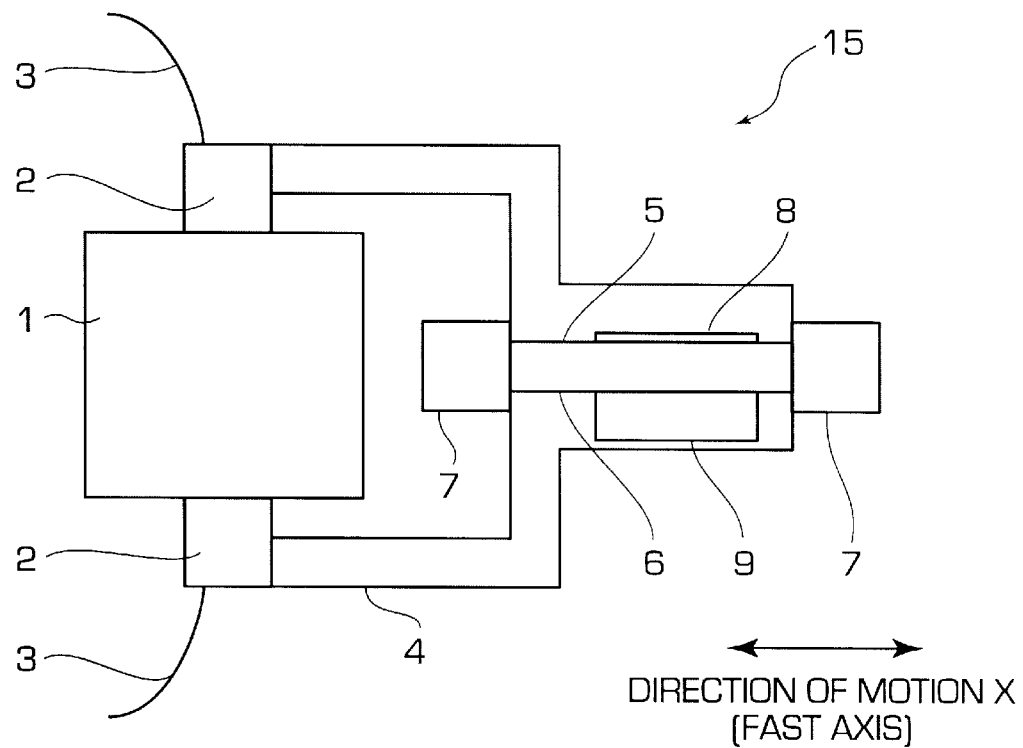
FIG. 1 is a top view of one embodiment of a voice-coil-driven translation stage for the scanning system according to the present invention.

Scanners may be characterized in one or more of a number of categories. A point-scanning confocal microscope with stationary optics focuses a beam of light to a stationary point and obtains a 2-dimensional image by moving the sample (e.g., a polymer array substrate) in 2 dimensions, for example X and Y directions (there may also be a $3^{rd}$ dimension, the Z direction, for focusing). As described above in the Background section, it scans a single point of light from one side of a sample to another side in one direction, e.g., X direction, (i.e., scanning one line) then moves the sample incrementally in another direction, e.g., Y direction, until all points of the sample are scanned.

One early example of such a scanner with limited application was developed by Marvin Minsky in 1955. (See the "Memoir on inventing the confocal scanning microscope," Scanning 10, 128–138 (1988), at web site http://www.ai.mit.edu/people/minsky/papers/confocal.microscope.txt.) Minsky uses a simple magnetic solenoid without computer control to move a flexure translation stage. H. T. M. Van der Voort et al. describe a similar but more modern system in Scanning 7, 66–78 (1985). The details for their scanning system is provided in the article H. J. B. Marsman et al., "Mechanical scan system for biological applications," Rev Sci Instrum 54, 1047–1052 (1983). Like Minsky, this point scanner uses flexure stages. Flexure translation stages are well suited for scanning small distances, for example 1 mm, but not for the larger distances, for example 14 mm, required for scanning polymer arrays.

One point-scanning confocal microscope with stationary optics useful for point scanning polymer arrays was disclosed by the present inventor in U.S. Pat. No. 5,631,734, which is hereby incorporated by reference in its entirety for all purposes. Since this system needs to scan polymer arrays it is provided with a large scan length sufficient to scan one dimension of a polymer array (e.g., scan length is 14 mm when array size is 12.8 mm×12.8 mm) and thus uses a crossed roller bearing XYZ translation table, for example a JMAR Precision Systems (Chatsworth, Calif.) "Slimline" or "Microline" table, instead of a flexure stage. This XYZ translation table is stepper motor driven and moves the polymer array relative to the fixed microscope objective lens to scan the polymer array along one scan line at a time. Either a lead screw or a ball screw converts the rotary motion of the stepper motor to linear motion. Scan speed with this system is limited because of the limited acceleration possible with stepping-motor-driven translation stages.

Another type of confocal microscope scanner is illustrated by a Molecular Dynamics (Sunnyvale, Calif.) scanner as shown in U.S. Pat. No. 5,459,325. This can be called a "point-scanning confocal microscope with a moving scan head." The scan head consists of a turning mirror (or turning prism) and objective lens mounted on a single-axis translation stage. As the scan head moves in this confocal microscope scanner, the focused laser beam moves along with it. The sample is mounted on a separate translation table that moves perpendicular to the scan head. The system obtains a 2-dimensional image by oscillating the scan head rapidly in one dimension and moving the sample slowly in another. The scan head is made small and light so that it can move fast. However, if the scan head is actuated with a stepper motor it suffers from a similar limitation in scanning speed as the point-scanning confocal microscope with stationary optics due to the stepper motor's slow acceleration.

In all of the confocal microscopes described above, the laser beam is always coaxial with the optical axis of the objective lens, and so is the reflected or emitted light (e.g., fluorescent light) that is collected by the objective lens. The objective lens can be relatively simple and inexpensive because it doesn't have to be corrected for off-axis aberrations. A narrow-angle lens, i.e. a lens that only has to focus light onto or nearly onto its optical axis, is easier to design and manufacture and contains fewer optical elements than a wide-angle lens having the same focal length, f number, resolution, etc. For example, an inexpensive 1 or 2-element lens system may be capable of focusing a laser beam to a 3-micron-diameter spot when the laser beam is coaxial with the optical axis of the lens. If the laser beam enters the lens several degrees off axis and consequently focuses several millimeters off axis, it will probably focus to a much larger spot size. If a 3-micron-diameter spot several millimeters off axis is needed, a more complicated and expensive lens will be required.

Another scanner used for polymer array analysis is a galvanometer-scanning confocal microscope ("galvo scanner") as disclosed in patent application U.S. Ser. No. 08/856,642 ('642), which is hereby incorporated herein by reference in its entirety for all purposes. The galvo (galvanometer) scanner includes a radial direction system with a galvanometer actuating a mirror to rapidly scan a laser light spot across a substrate (e.g., a polymer array). The galvo scanner is much faster than the scanners described above, achieving scanning speed of approximately 30 lines/second, but requires a large and expensive objective lens.

In operation, the galvo scanner ('642) uses an angularly oscillating mirror (a mirror mounted on a galvanometer) to direct the laser beam into an objective lens. The lens focuses the laser beam to a spot that moves back and forth over a distance of 14 mm as the mirror oscillates. The objective lens must therefore be corrected for aberrations up to 7 mm off axis. The same lens is used to collect fluorescence from the sample polymer array. The sample is mounted on a translation table and the scanner obtains a 2-dimensional image by moving the focused laser spot rapidly back and forth in one dimension and stepping the sample slowly in another. Thus, the galvo scanner is potentially very fast because galvanometers can oscillate at tens or hundreds of cycles per second. However, the objective lens is large and expensive because must be corrected for off-axis aberrations.

The objective lens in the '642 galvo scanner, for example, is 4 inches long and 2.5 inches in diameter and contains 6 optical elements. This objective lens has a numerical aperture of only 0.25, which means that it collects only about 1 out of 100 photons emitted by the sample. A higher numerical aperture is desirable. Higher numerical aperture results in higher collection efficiency and therefore better signal-to-noise ratio, all other things (laser power, scan speed, etc.) being equal. Unfortunately, a lens with the same resolution as the current lens (about 3 microns), but a significantly higher numerical aperture (e.g. 0.5) either would have a much smaller field of view (in which case a 12.8 mm×12.8 mm polymer array would have to be scanned in 2 or more sections) or would be even more complicated and expensive.

Another galvanometer-scanning confocal microscope is provided by Hewlett-Packard as disclosed in U.S. Pat. No. 5,585,639. It is a galvanometer-scanning confocal microscope but contains three multi-element lenses: one lens focuses the laser beam onto the sample, and a pair of lenses collects the fluorescence. Thus, this scanner is also expensive to build.

Another type of scanner is the "line scanner" which is different from all of the "point scanners" discussed above. Line scanners image an entire scan line at one time. For example, a "line scanner" is disclosed in U.S. Pat. Nos. 5,578,832 and 5,834,758, which are hereby incorporated herein by reference for all purposes. This scanner focuses the laser beam not to a point, but to a line a few microns wide and, for example, 14 mm long, so as to image one entire line of the polymer array sample at a time. An objective lens (or a pair of objectives back to back) collects fluorescence and images the fluorescence onto a linear CCD having 1024 or more pixels. The polymer array sample is mounted on a translation table. Thus, the line scanner obtains a 1-dimensional image with no motion and a 2-dimensional image with only one axis of motion. Therefore, the line scanner can potentially be very fast because there is no need for a fast scan axis—scan speed is limited not by mechanical considerations such as the acceleration of a stepping motor connected to a translation table or scan head, but by the speed of the electronics or software. However, a linear-CCD-based scanner is optically complicated.

The present invention provides systems and methods for achieving high speed cost effective scanning and imaging of a sample containing labeled materials, for example scanning arrays of polymer sequences such as oligonucleotide arrays. The invention has a wide range of uses, particularly those requiring quantitative study of a microscopic region from within a larger region. For example, the invention can obtain a fluorescence image of a 14 mm×14 mm area with 1.5 $\mu$m or 3.5 $\mu$m, or smaller pixels. For example, the invention may find application in the field of histology (for studying histochemical stained and immunological fluorescent stained images), or fluorescence in situ hybridization. In one application, the invention herein is used to image a packaged polymer array, for example a GeneChip® probe array.

In general, the invention provides a scanning system capable of scanning an image with pixels having a size of approximately 3.5 $\mu$m or less with a means for moving a linear translation stage that can attain a speed of at least 10 scanning lines/second, and preferably at least 30 scanning lines/second, while accurately detecting the image. Such a system may include, for example, a voice coil that provides increased acceleration and resulting fast scanning speed.

A scanner employing a voice coil driven translation stage may combine the speed of a galvo scanner with the optical simplicity of a point-scanning confocal microscope with stationary optics (e.g., the scanner disclosed in U.S. Pat. No. 5,631,734 hereby incorporated by reference herein) to obtain accurate and reliable image detection using, for example, a 1.5 or 3.5 $\mu$m or smaller pixel size. Voice coil actuators are direct drive, limited motion devices that utilize a permanent magnet field and a coil winding (conductor) to produce a force proportional to the current applied to the coil.

One example of an appropriate voice coil is linear actuator voice coil Model No. LA14-24-000 offered by Kimco Magnetics Division of BEI Technologies Inc. Another example of an appropriate voice coil is linear actuator voice coil Model No. LA34-37-000A also offered by Kimco Magnetics Division of BEI Technologies Inc. (See "Voice coil actuators: An applications guide" provided by Kimco Magnetics Division, BEI Technologies Inc, San Marcos Calif.) These are two examples of voice coils that are useful in the present invention for driving a translation stage. These are merely examples of voice coils readily available that can work in the present invention. Many other voice coils could work as well. For example, a voice coil for driving a translation stage in the present invention could be custom designed (i.e., by BEI Kimco or another company) if necessary.

The use of the readily available standard voice coils for driving a translation table could cause the voice coil to overheat and fail if it is required to move too much weight. For example, if a voice-coil-driven stage scans 14 mm at a speed of 560 mm/sec, then the time to scan 14 mm is 25 msec. If we allow 4.166 msec for acceleration and another 4.166 msec for deceleration, then the acceleration or deceleration is 134.4 m/sec$^2$ (13.7 g, where g is the acceleration due to gravity) and the total time to scan one line is 33.333 msec. If the moving parts weigh 0.5 lb, then the force required for 13.7 g of acceleration is 6.85 lb. The BEI Kimco LA14-24-000 voice coil, for example, has a force constant of 1.6 lb/amp. The current required for 6.85 lb of force is therefore 4.28 A. The coil has a resistance of 7 ohms when hot. The power dissipated in the coil at 4.28 A is therefore 128 W. When the stage is not accelerating or decelerating, the current is zero, which means that the average power dissipated in the coil is 32 W. The coil has a thermal resistance of 3.4° C./W, which means that the coil temperature is 134° C. if the ambient temperature is 25° C. The coil is rated for a maximum temperature of 130° C.

The previous example calculations ignore friction and do not include a safety margin. However, it is conservative in that there is probably no need for the moving parts to weigh 0.5 lb if the system is properly constructed.

The scanning system should be constructed so as to take advantage of the fast acceleration of the voice coil while ensuring that the weight the voice coil must move is less than the weight which will cause the voice coil to overheat and fail due to excessive power dissipation. The moving part of, for example, an NB Corporation of America (Wood Dale, Ill.) model SER9A slide weighs approximately 20 grams (see illustration in FIG. 2, item 10 and FIG. 4 item 25). A variety of linear slides, using either linear or recirculating ball bearings, linear or recirculating crossed roller bearings, or air bearings, may be suitable. A packaged DNA array weighs, for example, 16 grams. The moving part of the LA14-24-000 voice coil weighs approximately 22 grams. If the bracketry that holds all of these moving parts together is designed to weigh, for example, 55 grams, and the scanner is designed so that these are the primary components that the voice coil must move, then the total weight of the moving parts is approximately 0.25 lb, and the power dissipated in the coil is only 25% of what was calculated above (actually less than 25% of what was calculated above, because the voice coil resistance is only 5 ohms when operating cool). Furthermore, the voice coil can be cooled with forced air (e.g. a fan, or a jet of compressed air) if additional cooling is needed to improve performance.

The LA14-24-000 can provide improved scanning time over conventional scanners that use stepper motors to drive the fast scan axis, i.e., a decrease in the amount of time it takes to scan each line of the fast scan axis when scanning a polymer array. The steady-state scan speed of a scanner using the LA14-24-000 in inches/second is about 22 inches/second and the acceleration is very high, about 13.7 G (where G is the acceleration due to gravity), enabling the device to scan 14 mm at 30 lines/second. This speed is comparable to the maximum scan speed of the galvo scanner. However, in practice the galvo scanner, having a low numerical aperture objective lens, may be operated at considerably less than this maximum speed because of lower signal-to-noise ratio at the higher speeds.

The voice coil scanner can be designed so that a voice-coil-driven translation stage operates to move either the polymer array (i.e., similar to the point-scanning confocal microscope with stationary optics previously discussed) or the objective lens and turning mirror (similar to the Molecular Dynamics scanner previously discussed) in the fast axis (X) direction. The slow axis (Y direction) and the focus axis (Z direction) can be driven by stepping motors, although voice coils also can be used for these axes.

Figure 2:
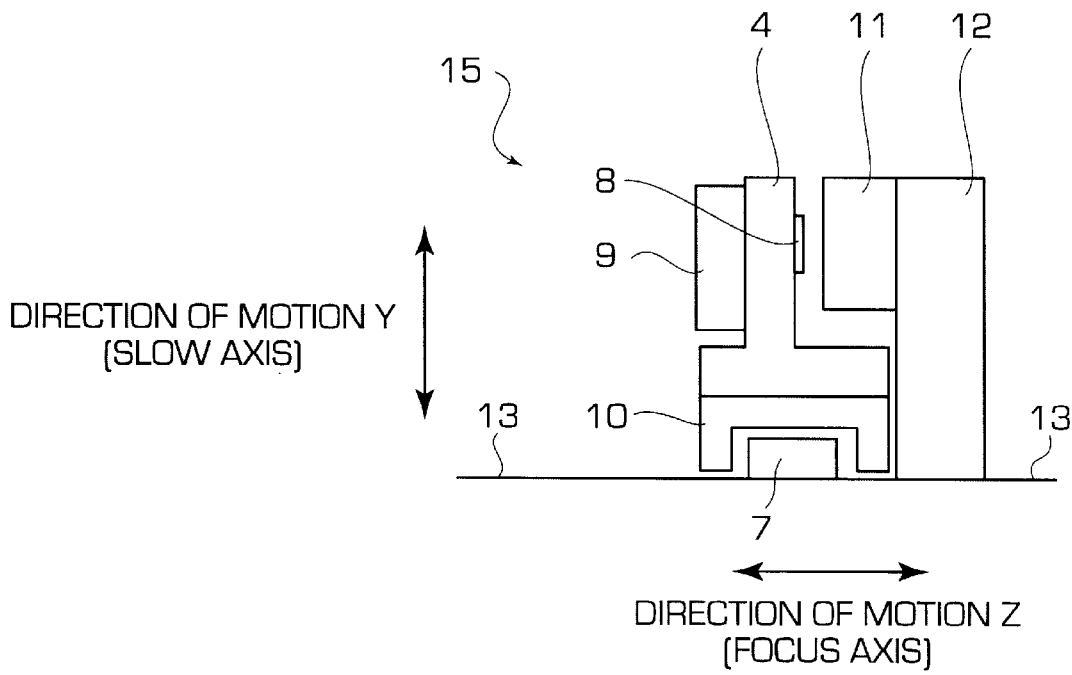
FIG. 2 is an end view of one embodiment of a voice-coil-driven translation stage with an encoder readhead for the scanning system according to the present invention.

Referring now to FIGS. 1 and 2, a first preferred embodiment of the invention having a voice coil driven translation stage mechanized to move the polymer array in the fast X axis direction is illustrated. This embodiment uses a slide type voice coil. The voice coil scanner of this embodiment has a voice coil translation stage 15 which includes a voice coil magnet and mounting bracket 1 mounted in a stationary manner to the top surface 13 of a 2-axis (YZ) translation table. The voice coil has a moving coil 2 that moves along a slide in the fast axis (X axis) direction in response to current provided to wires 3. The voice coil used in this embodiment may be, for example, a BEI Kimco Magnetics Division Voice Coil Linear Actuation Model No. LA14-24-000 or any other voice coil having similar or better thermal, mechanical, and electrical characteristics. All else being equal, the weight of the moving coil should be minimized, the force constant of the coil (in pounds per amp) should be as large as possible, and the thermal resistance of the coil (in degrees per watt) should be as small as possible.

The moving coil 2 of the voice coil is connected to the movable part 10 of a linear slide by bracket 4. This bracket should be made of a design and material so that it is light weight so as to require minimal translation force and strong enough to remain rigid during oscillation of the linear slide. For example, the bracket may be made of steel or aluminum and have a weight of up to 55 grams. Although bracket 4 is illustrated as one piece it may be made of multiple pieces. Bracket 4 has a surface 5 upon which an encoder scale 8 is mounted. The encoder scale 8 operates with the encoder readhead 11 to monitor the position of a polymer array sample 9 mounted to the sample mounting surface 6 of bracket 4. The weight of the encoder scale should also be minimized as much as possible since it is connected to the moving parts of the voice coil translation stage. The readhead 11 is mounted to the top surface 13 of the 2-axis translation stage by readhead mounting bracket 12. The readhead 11 and the scale 8 may be, for example, a Renishaw Inc. (Schaumburg, Ill.) RGH22Z readhead and a Renishaw RGS-S scale, respectively.

The stationary guide portion 7 of the linear slide is mounted to the top surface 13 of the 2-axis translation table. The linear slide should be selected so that the weight of the moving part 10 and friction coefficient of the linear slide is minimized so that the force require by the voice coil and thereby the power dissipation of the voice coil are within the thermal capability of the voice coil. The linear slide may be, for example, NB Corporation of America crossed roller bearing linear slide, model SER9A, or any other ball bearing, crossed roller bearing, or air bearing linear slide that meets the mechanical and operational qualities for reliable fast axis translation of the polymer array.

The 2-axis translation table having top surface 13 may be, for example, a JMAR Precision System 2-axis Slimline or Microline translation table or any other translation table that can provide reliable 2-axis translation. As illustrated in FIG. 2, the translation table will provide movement in the slow axis (Y axis) direction and the focus axis (Z axis) direction. If a 3-axis translation table with sufficiently long travel is used, the present invention has the capability of scanning an entire wafer of polymer arrays sequentially, one array at a time.

In operation the voice coil translation stage 15 is provided a driving current from an amplifier (e.g., a servoamplifier) through wires 3. The moving part 2 of the voice coil moves the bracket 4, encoder scale 8, polymer array 9, and moving part 10 of the linear slide in the fast axis x direction along the guide part 7 of the linear slide. A control system senses the location of the polymer array 9 using information from the encoder readhead 11 and indicates when one complete translation in the x direction is complete. Once one complete x direction fast axis scan is complete the translation table will index approximately the width of one fast scan line in the slow axis Y direction and the controller will trigger another fast scan by the voice coil. This sequence occurs repeatedly until the entire polymer array, or a predefined portion thereof, has been scanned by a confocal microscope image system.

If a 3-axis translation table is being used to scan a wafer of polymer arrays, the x direction axis of the 3-axis translation table will then move to the next polymer array on the wafer and the above described polymer array scanning sequence will be repeated. Once all arrays in a row on the wafer have been scanned the translation table will move in the slow axis Y direction to the next row of arrays to be scanned. These steps will be repeated until the entire wafer of polymer arrays has been scanned.

FIGS. 3 and 4 illustrates another preferred embodiment of the invention having a voice coil driven translation stage mechanized to move a scanning beam of light across a polymer array in the fast X axis direction. This embodiment uses a plunger type voice coil, for example, a BEI Kimco model LA34-37-000A or any other voice coil having similar mechanical and electrical characteristics. The voice coil scanner of this embodiment has a voice coil translation stage 30 which includes a voice coil mounting bracket 16, a voice coil magnet and housing 17 (stationary part of the voice coil), an electrical coil winding section 18 (moving part of the voice coil), and wires 19 connecting to the coil 18.

Unlike the previous embodiment, the voice coil mounting bracket 16 is not mounted to the top surface 13 of the 2-axis translation stage. Rather, the voice coil mounting bracket 16 can be mounted to another structure which is preferably stationary relative to the confocal microscope image system used in the scanning system.

The moving coil 18 of the voice coil is connected to the moveable part 25 of a linear slide by bracket 20. This bracket should be made of a design and material so that it is lightweight so as to require minimal translation force and strong enough to remain rigid during oscillation of the linear slide. For example, the bracket may be made of steel or aluminum and have a weight in the range of up to 0.5 lb. Although bracket 20 is illustrated as one piece it may be made of multiple pieces. Bracket 20, like bracket 4 of the previous embodiment, has a surface upon which an encoder scale 21 is mounted. A turning mirror, penta-prism, or right-angle prism 22 (reflector) and objective lens 23 are mounted on the bracket 20 opposite the encoder scale 21. The encoder scale 21 operates with the encoder readhead 27 to monitor the position of the scan head. To minimize image distortion due to pitch and yaw of the linear slide, encoder scale 21 should be as close as possible to the focal point of lens 23. The encoder scale 21, turning prism 22, and objective lens 23, should be light weight to ensure the voice coil does not overheat. The readhead 27 and the scale 21 may be, for example, a Renishaw RGH22Z readhead and a Renishaw RGS-S scale. However, another type of position sensing system may be used, for example a Zeiss encoder. The readhead 27 is mounted to the top surface 26 of an optical breadboard, for example a Newport Corp (Irvine, Calif.) RG series breadboard, by read head mounting bracket 28.

The guide portion 24 of the linear slide is mounted to the top surface 26 of the optical breadboard. The linear slide should be selected so that the weight of the moving part 25 is minimized to minimize the force required by the voice coil and thereby the power dissipation of the voice coil are within the thermal capability of the voice coil. The linear slide may be, for example, Parker/Daedel (Harrison City, Pa.) crossed roller bearing linear slide model CR4501, or any other ball bearing, crossed roller bearing, or air bearing linear slide with sufficient straightness and flatness of travel and sufficiently light weight that it can operate at the desired speed.

In this embodiment, the moving parts are much heavier (for example, 2 lb) than in the previous embodiment. However, the voice-coil-driven linear stage is still able to scan 14 mm at 30 lines/second without overheating because of the thermal and electrical characteristics of the LA34-37-000A voice coil (the force constant is 5.4 lb/amp, the resistance is 1.4 ohms, and the thermal resistance is 2.2 degrees C per watt).

Unlike the previous embodiment, the guide portion 24 of the linear slide is not directly connected to the top surface 13 of the 2-axis (or 3 axis) translation table. Rather the 2-axis translation table having top surface 13 has the polymer array sample 9 mounted directly to it and is adjacent to the voice coil driven translation stage. The surface of polymer array 9 is perpendicular to the optical axis of scan head objective lens 23. The 2-axis translation table having top surface 13, may be for example, JMAR Precision System 2-axis Slimline or Microline translation table or any other translation table that can provide reliable 2-axis translation. As illustrated in FIG. 4, the translation table will provide movement of the polymer array in the slow axis (Y) direction and the focus axis (Z) direction.

In operation, the voice coil translation stage 30 is provided a driving current from an amplifier (e.g., a servoamplifier) through wires 19. The moving part 18 of the voice coil moves the bracket 20, encoder scale 21, turning mirror or prism 22, objective lens 23, and moving part 25 of the linear slide in the fast axis (X) direction along the guide part 24 of the linear slide. The scan head comprised of the turning mirror or prism 22 and the objective lens 23 mounted on the bracket 20 will scan a point of light from a laser light beam on to the surface of the polymer array 9 in a linear manner in the fast axis (X) direction. A control system senses the location of the scan head using information from the encoder readhead 27 and indicates when one complete translation in the X direction has been completed. Once one complete X direction fast axis scan is complete the translation table will index approximately the width of one fast scan line in the slow axis (Y) direction and the controller will trigger another fast scan by the voice coil. This sequence occurs repeatedly until the entire polymer array, or a predefined portion thereof, has been scanned.

As with the first embodiment, if a 3-axis translation table is being used to scan a wafer of polymer arrays, the x direction axis of the 3-axis translation table will then move to the next polymer array on the wafer and the above described polymer array scanning sequence will be repeated. Once all arrays in a row on the wafer have been scanned the translation table will move in the slow axis (Y) direction to the next row of arrays to be scanned. These steps will be repeated until the entire wafer of polymer arrays has been scanned.

Figure 5:
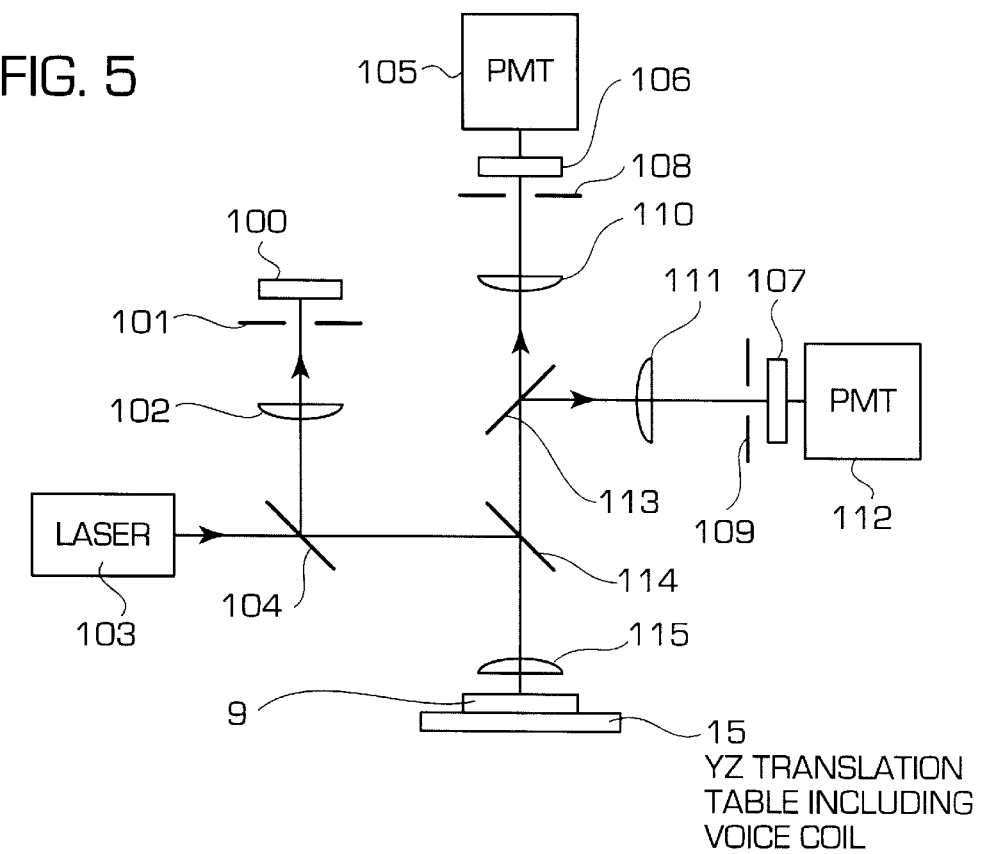
FIG. 5 is an illustration of a scanning system according to the present invention having a 3-axis XYZ translation system with one fast axis (X axis) driven by a voice-coil.
Figure 6:
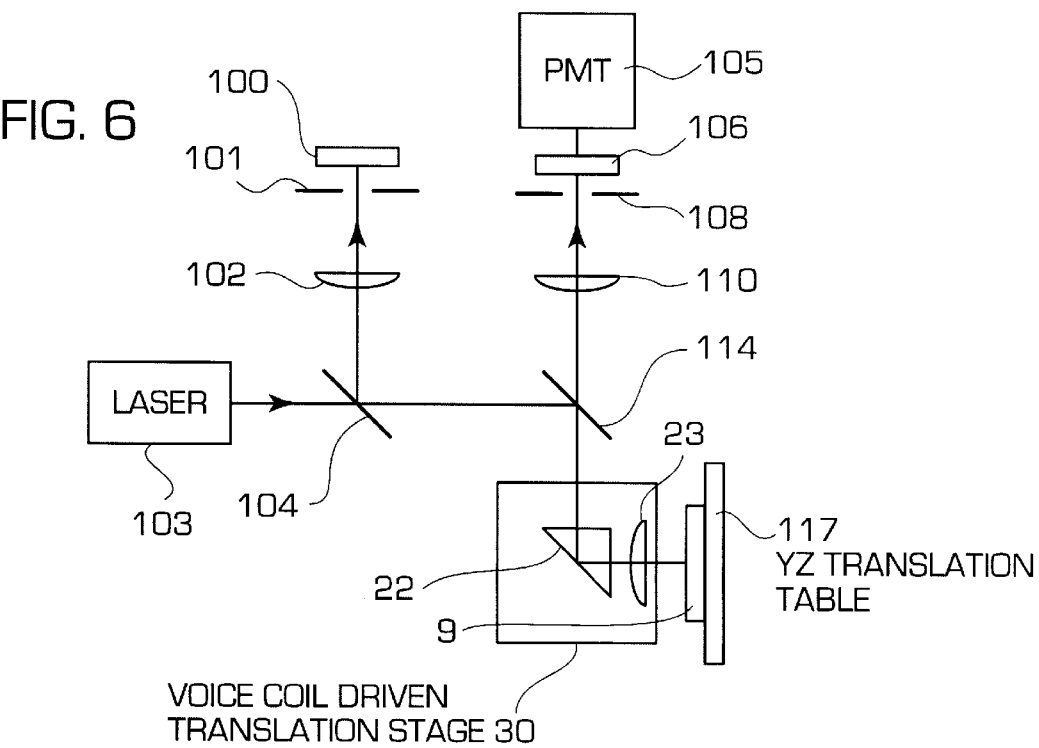
FIG. 6 is an illustration of a scanning system according to the present invention having a turning prism and objective lens mounted on a single axis voice-coil driven translation stage.

FIGS. 5 and 6 illustrate two alternative confocal imaging systems that may be used for the present invention in detecting, for example, florescence emitted by targets bound to the polymer arrays. Alternative confocal imaging systems that may be modified to use a voice coil fast axis translation stage include those found in U.S. Pat. No. 5,631,734 and U.S. application Ser. No. 08/856,642, which are hereby incorporated herein for all purposes. The system of U.S. application Ser. No. 08/856,642 would be further modified to eliminate the galvo scanning mirror and to have a simple inexpensive objective lens mounted in a stationary position or within a scan head. A brief description of the configuration and operation of the confocal imaging systems shown in FIGS. 4 and 5 follows. A more detailed understanding of the overall operation of the confocal imaging systems described herein can be obtained by reading U.S. Pat. No. 5,631,734 and U.S. application Ser. No. 08/856,642, herein incorporated by reference.

FIG. 5 illustrates a confocal imaging system having a stationary (fixed position) objective lens 115. The sample 9 is mounted on a 3-axis translation stage 15 having a voice-coil-driven fast (X) axis.

As illustrated in FIG. 5, the confocal imaging system includes a laser for generating a laser light beam that is transmitted through beamsplitter 104, reflected by dichroic beamsplitter 114, and focused by objective lens 115 onto the surface of polymer array sample 9. The laser light that is reflected by the surface of polymer array sample 9 is collimated by objective lens 115, reflected by dichroic beamsplitter 114 and beamsplitter 104, and focused by lens 102 onto pinhole 101. The portion of the reflected laser light that is transmitted through pinhole 101 is detected by photodiode 100. Photodiode 100 provides a signal to a controller to adjust the position of the sample so that the laser beam is focused on the surface of the polymer array sample 9. The controller will activate, for example, a stepper motor in the 2-axis (YZ) translation table so as to move the translation table in the focus axis (Z) direction until the laser light beam is properly focused on the surface of the polymer array sample 9.

In another embodiment (not shown in a figure), the sample is mounted on a 2-axis (XY) translation stage having a voice-coil-driven fast (X) axis, and the objective lens is mounted on a separate single-axis (Z) translation stage. In this embodiment the Z translation stage can be very small and light (for example, the "PIFOC" piezoelectric microscope focusing device available from Polytec PI, Inc., Auburn, Mass.) because only the objective lens is mounted to it.

The confocal imaging system of FIG. 5 also includes two photomultiplier tubes (PMT) 105 and 112, each one for detecting fluorescence having a particular range of wavelengths emitted from the surface of the polymer array sample. For example, PMT 112 may detect fluorescence from fluorescein-labeled target molecules and PMT 105 may detect fluorescence from phycoerythrin-labeled target molecules. The PMT (105, 112) may be, for example, a Hamamatsu R4457 or R6357 photomultiplier tube, or any other PMT having sufficiently high quantum efficiency at the wavelengths of interest and sufficiently low dark current. Various types of light detectors other than a PMT also may be used, including photodiodes, avalanche photodiodes, phototransistors, vacuum photodiodes, and other light detectors.

The confocal imaging system of FIG. 5 further includes optical trains to separate, for example, two unique colors of fluorescent light. A first color fluorescent light is emitted from a particular marked target on the polymer array sample 9 surface, collimated by objective lens 115, transmitted through dichroic beam splitters 113 and 114, lens 110, pinhole 108, and bandpass filter 106, and sensed by PMT 105. Similarly, a second color fluorescent light different from the first color fluorescent light is emitted from a different particular marked target on the polymer array sample 9 surface, collimated by objective lens 115, transmitted through dichroic beam splitter 114, reflected by dichroic beamsplitter 113, transmitted through lens 111, pinhole 109, and bandpass filter 107, and sensed by PMT 112.

FIG. 6 illustrates a confocal imaging system having an objective lens 23 and turning mirror or prism 22 mounted on a voice-coil-driven translation stage 30 that moves in the fast-scan (X) direction. The sample 9 is mounted on a separate 2-axis (YZ) translation stage.

Laser 103 produces a laser light beam that is transmitted through beamsplitter 104, reflected by dichroic beamsplitter 114 and turning mirror or prism 22, and focused by objective lens 23 onto the polymer array sample 9 surface. As the scan head moves back and forth in the X direction, the laser beam and the collected fluorescence remain centered on mirror or prism 22 and objective lens 23. Lens 102, pinhole 101, and photodiode 100 are used for detection of reflected laser light and provide the sensing capability for adjusting the focus of the laser light beam. Lens 110, pinhole 108, bandpass filter 106 (or longpass filter), and PMT 105 enable sensing of, for example, one color fluorescent light emitted by one type of target on the polymer array 9 surface. Thus, this confocal imaging system can only detect, for example, one color fluorescent light emitted from one type of target on the polymer array surface because it does not include dichroic beamsplitter 113, lens 111, pinhole 109, and PMT 112.

In this embodiment, the voice coil translation stage 30 has a turning prism 2 and objective lens 23 securely mounted on a scan head. The laser light beam from laser 103 is reflected by dichroic beamsplitter 114 onto turning prism 22 and through the objective lens coaxial with the objective lens's optical axis. The laser light beam strikes the turning prism 22 surface at the same location and remains coaxial with the optical axis of the objective lens 23 throughout the fast axis (X) translation of the scanning head. As a result, the laser light beam scans a line on the surface of the polymer array in the fast axis (X) direction using the movement of the scan head rather than the movement of the polymer array sample 9.

Many alternative configurations of the confocal imaging systems described above are possible. For example, a system having 2 PMTs as shown in FIG. 5 can be used with a moving scan head instead of stationary optics. A system having one PMT as shown in FIG. 6 can be used with stationary optics instead of a moving scan head. It is to be understood that the confocal imaging system of the present invention could have any number of lasers, PMTs and related optical trains, as many as the number of different types of light to be uniquely detected. Furthermore, a slide-type voice coil can be used to operate a moving scan head and a plunger-type voice coil can be used with stationary optics, or vice versa.

The objective lens for a voice coil polymer array scanner can be a microscope objective (for example Rolyn Optics, Covina Calif., model 80.3090, 0.65 numerical aperture) or a single-element aspheric lens (for example ThorLabs, Newton N.J., model 350330-A, 0.68 numerical aperture). A single-element aspheric lens is significantly smaller and lighter than a microscope objective and thus may be better for the scan head embodiment of the present invention. A single-element aspheric objective lens is not corrected for chromatic aberrations, but if the focal length is small enough, chromatic correction may not be necessary. For example, the ThorLabs 350330-A has a focal length of 3.1 mm, and the axial color at 580 nm (approximately the phycoerythrin emission peak) is only about 0.33 microns per nanometer (i.e. 0.33 micron change in focal length per 1 nm change in wavelength). Alternatively, a custom 2-element cemented doublet (for example, a biconvex BK7 element cemented to a biconcave SF6 element) can be used to correct for the axial color introduced by the single-element aspheric lens. The doublet can be placed either between lens 23 and mirror or prism 22 or between dichroic beamsplitter 114 and mirror or prism 22.

Other types of objective lenses can also be used, for example a refractive/diffractive hybrid lens (i.e. a lens having at least one refractive surface and at least one diffractive surface), or a 2-element aspheric lens having a numerical aperture of 0.85 (Sony U.S. Pat. No. 5,880,893).

An objective lens with a numerical aperture of 0.68 has about 8 times the collection efficiency of a lens with a numerical aperture of 0.25. As discussed above, although the galvo scanner is capable of scanning at 30 lines/sec, it is often operated at 7.5 lines/sec because the collection efficiency of its objective lens and signal-to-noise ratio at 30 lines/sec is insufficient for some assays. A voice coil scanner running at 30 lines/sec provides a better signal-to-noise ratio than a galvo scanner that is running at 7.5 lines/sec because the voice coil scanner's objective lens can have a much higher collection efficiency.

Figure 7:
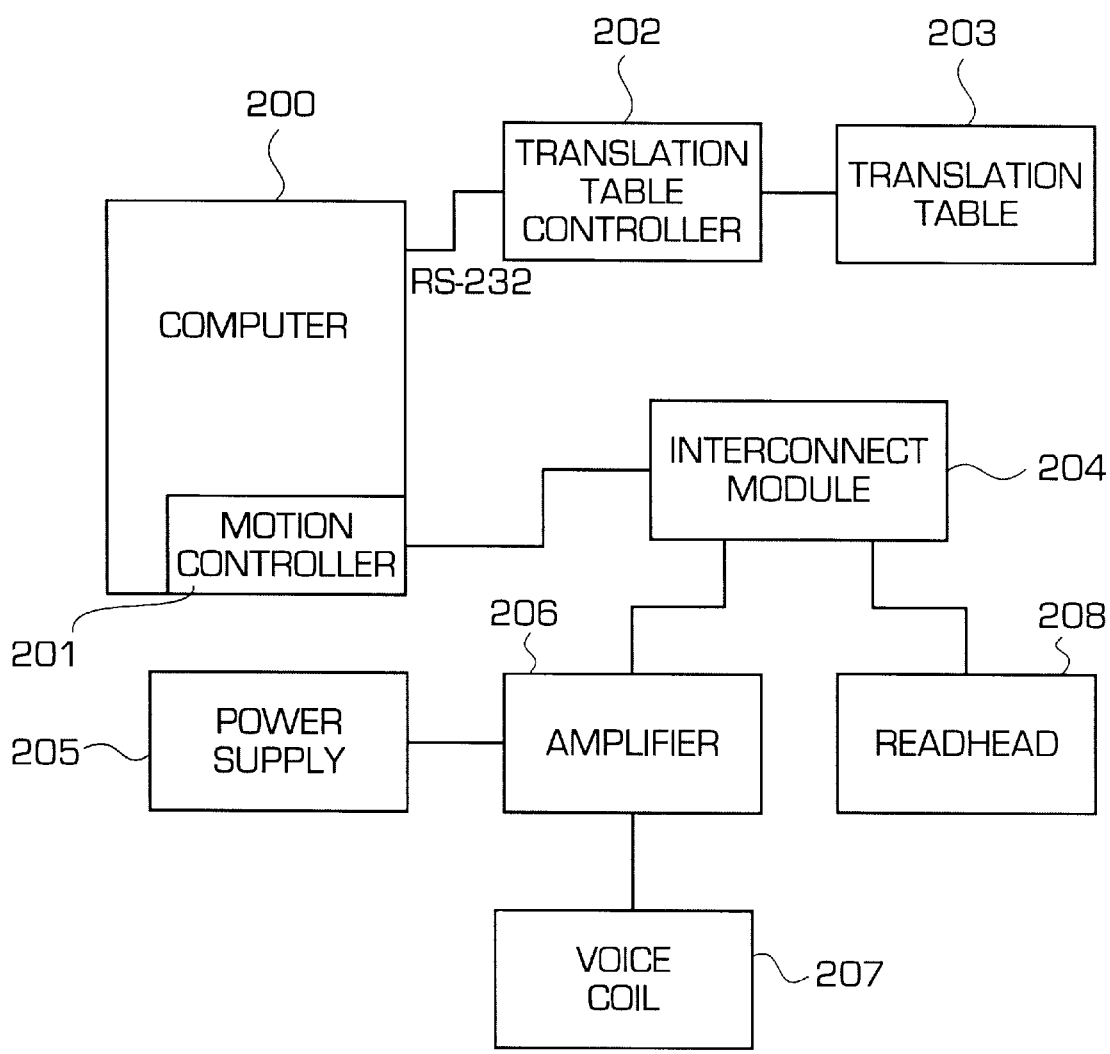
FIG. 7 is a block diagram of one embodiment of a motion control system according to the present invention.

A control system to control a voice coil and translation table in the polymer array analysis system of the present invention is illustrated in FIG. 7. The control system includes a computer 200, for example, a 400 MHz Pentium II PC, with a (servo) motion controller 201. The motion controller 201 installed in (or connected to) the computer 200 accepts digital commands from the computer and produces an analog output in the range of −10 V to +10 V. The motion controller may be, for example, the Galil Motion Control (Mountain View, Calif.) model DMC-1710, the Delta Tau Systems (Northridge, Calif.) model PMAC-Lite, or various other controllers from other companies such as Motion Engineering Inc., etc.

An amplifier 206 (e.g., a linear or pulse-width-modulated servoamplifier), for example a Galil MSA-12-80, accepts the analog signal from the motion controller 201 via an interconnection module 204, for example Galil ICM-1900, and outputs the appropriate current to the voice coil 201. The amplifier 202 is provided with power by power supply 205, for example Galil CPS-15-40. An encoder system with a readhead 208 provides position feedback to the controller. Suitable encoder systems with readhead 208 are quadrature-output encoders with resolutions of 1 micron to 0.1 micron. The encoder system may be, for example, Renishaw RGH22Z readhead and RGS-S scale. Other suitable encoders are manufactured by Zeiss and other companies.

Some motion controllers (e.g., the Galil DMC-1710) can be programmed to produce TTL output pulses when certain positions are reached. For every scan line, the controller can produce a "line clock" pulse, which instructs the data acquisition board to begin acquiring a block of data, and a series of "pixel clock" pulses (for example, one pulse for every 1.5 micron change in position), each of which triggers one A/D conversion. These clock pulses can be used to prevent the jitter that might otherwise appear in the images. Using this procedure, it is possible to take data bi-directionally and have the odd and even lines of the image aligned within a fraction of a pixel.

Finally, the control system of FIG. 7 includes a translation table controller (indexer) 202, for example a JMAR indexer, connected to the computer 200 via an RS-232 cable. The translation table controller 202 is connected to the translation table 203, for example a JMAR Precision Systems 2-axis Slimline translation table. Thus, the same computer may be used to control the movement of the voice coil 207 linear slide and the translation table 203 for quick and coordinated scanning of the polymer array 9.

Data acquisition with the voice coil scanner is similar to data acquisition with the galvo scanner described in U.S. patent application Ser. No. 08/856,642. Photomultiplier output current is converted to voltage by an op-amp circuit, low-pass filtered by, for example, a 4-pole Bessel filter, and digitized by a 12-bit or 16-bit data acquisition board, for example a Computer Boards Inc. (Middleboro, Mass.) model CIO-DAS16/M1. Currently two versions of the data acquisition software exist. One version takes 9216 data points per scan line, one data point every 1.5 microns. The other takes 4096 data points per scan line, one data point every 3.5 microns. Data are taken at the rate of 30 scan lines per second. Data are taken bidirectionally, i.e. odd-numbered scan lines are taken while the voice-coil-driven axis is moving in the +X direction and even-numbered scan lines are taken while the voice-coil-driven axis is moving in the −X direction. With either version of the software, two or more data points are summed if coarser resolution is desired. Data are displayed on a computer screen as gray-scale images and are written to disk as 16-bit binary files.

As illustrated above, the voice coil can be applied to move the polymer array in a fixed objective lens system or to move a scan head having the objective lens. In either case, the scan speed including acceleration is improved and the confocal microscope lens system is simple, efficient, and inexpensive. Therefore, a high performance, high throughput scanner is provided by the voice coil scanner of the present invention.

All other things (e.g., pixel size, scan speed, laser power, etc.) being equal, a voice coil scanner of the present invention will provide about 8 times as many detected photons per feature as a galvo scanner. Therefore, the voice coil scanner of the present invention will prove very useful as feature sizes of polymer arrays are reduced.

The present invention provides improved systems and methods for detection of fluorescence images on a substrate. It is to be understood that the above description is intended to be illustrative and not restrictive. Many embodiments will be apparent to those skilled in the art upon reviewing the above description. Although the above described systems and methods has been described primarily herein with regard to the detection of fluorescent marked targets, it will readily find application to other areas. For example, the detection apparatus disclosed herein could be used in the fields of catalysis, DNA or protein gel scanning, and the like. The scope of the invention should therefore be determined not only with reference to the above description but should also be determined with reference to the appended claims along with a full scope of equivalents to which the claims are entitled.

All publications, patents, and patent applications cited herein are hereby incorporated by reference in their entirety for all purposes.

What is claimed is:

1. A scanning system comprising:
    a translation stage including a voice coil, a linear slide and a bracket, said bracket connecting said voice coil to said linear slide and having a surface configured for mounting a polymer array;
    a translation table coupled to said translation stage and movable along a slow scan axis and along a focus axis; and
    a scanner for detecting an image on the polymer array.

2. The system of claim 1, wherein said voice coil, linear slide and bracket are configured to translate said polymer array at least 2 mm at least 10 times per second along a fast scan axis.

3. The system of claim 2, wherein said slow scan axis is substantially perpendicular to said fast scan axis, and said focus axis is substantially perpendicular to said fast scan axis and said slow scan axis.

4. The system of claim 1, wherein said voice coil, linear slide and bracket are configured to translate said polymer array over a distance of at least 5 mm at least 20 times per second along a fast scan axis.

5. The system of claim 1, wherein said voice coil, linear slide and bracket are configured to translate said polymer array over a distance of at least 14 mm at least 30 times per second along a fast scan axis.

6. The system of claim 1, wherein a packaged polymer array is mounted to said surface of said bracket.

7. The system of claim 1, wherein said translation table comprises a first stepper motor for moving said table along said slow scan axis and a second stepper motor for moving said table along said focus axis.

8. The system of claim 7, wherein said translation stage further comprises a scale on said bracket.

9. The system of claim 8, wherein said scanner comprises a confocal microscope image detection device having an objective lens, and the system provides accurate and reliable image recognition using a pixel size of 3.5 µm or smaller.

10. The system of claim 9, wherein said objective lens is selected from the group consisting of a microscope objective lens, an aspheric lens with a doublet lens, an aspheric lens without a doublet lens, and a refractive/diffractive hybrid lens.

11. The system of claim 2, further comprising a control system for controlling the motion of said translation stage.

12. The system of claim 11, wherein said control system comprises:
an amplifier connected to said voice coil;
a computer;
a motion controller connected to said computer; and
a translation table controller connected to said computer and said translation table.

13. The system of claim 12, wherein said motion controller is configured to produce line clock pulses and pixel clock pulses for prevention of image jitter.

14. The system of claim 13, wherein said control system includes a readhead for sensing location of said translation stage.

15. The system of claim 14, wherein said control system includes an interconnection module connected to said readhead, said voice coil, and said motion controller.

16. The system of claim 10, wherein said system scans a polymer array image size of 1 cm×1 cm or larger.

17. A scanning system comprising:
a translation stage including a voice coil, a linear slide and a bracket, said bracket connecting said voice coil to said linear slide and said bracket having a reflector and an objective lens mounted thereon, said translation stage configured for directing a scanning beam across a polymer array; and
a translation table having a surface for mounting a polymer array for scanning by a beam of light directed through said reflector and objective lens, wherein said table is movable along a slow scan axis and along a focus axis.

18. The system of claim 17, and wherein said translation stage is configured to move the scanning beam at least 2 mm across the polymer array at least 10 times per second along a fast scan axis.

19. The system of claim 12, wherein said slow scan axis is substantially perpendicular to said fast scan axis, and said focus axis substantially parallel to the scanning beam.

20. The system of claim 17, wherein said translation stage is configured to move said scanning beam over a distance of at least 5 mm at least 20 times per second along a fast scan axis.

21. The system of claim 19, wherein said translation stage is configured to move said scanning beam over a distance of at least 14 mm at least 30 times per second along a fast scan axis.

22. The system of claim 17, wherein said reflector is selected from the group consisting of a mirror and a turning prism.

23. The system of claim 22, wherein said objective lens is selected from the group consisting of a microscope objective lens, an aspheric lens with a doublet lens, an aspheric lens without a doublet lens, and a refractive/diffractive hybrid lens.

24. A scanning system comprising:
a translation stage movable along a fast scan axis, said translation stage including a voice coil, means for linear translation, means for securely mounting a polymer array and means for connecting said voice coil, said linear translation means and said mounting means; and
a translation table coupled to said translation stage and movable along a slow scan axis and along a focus axis.

25. The scanning system of claim 24, further comprising a scanner for detecting an image on the polymer array, wherein
said voice coil, linear translation means, mounting means and connecting means are configured to translate said polymer array at least 2 mm at least 10 times per second along a fast scan axis.

26. The scanning system of claim 25, wherein said slow scan axis is substantially perpendicular to said fast scan axis, and said focus axis is substantially perpendicular to said fast scan axis and said slow scan axis.

27. The system of claim 25, wherein said means for linear translation is a crossed roller bearing linear slide that provides single axis translation and said means for connecting is a bracket made of a light weight rigid material.

28. A polymer array scanning system comprising:
a linear actuator having a permanent magnet portion and a coil winding portion;
a linear slide;
a bracket connecting said linear actuator to said linear slide, said bracket having a scan head mounted thereto for scanning a laser light beam across a surface of a substrate along a fast scan axis; and
a translation table for mounting a polymer array for scanning by the laser light beam, wherein said table is movable along a slow scan axis and along a focus axis.

29. The system of claim 28, wherein said linear actuator, linear slide and bracket are configured to scan said beam at least 2 mm over the substrate surface at least ten times per second along the fast scan axis.

30. The system of claim 29, wherein said slow scan axis is substantially perpendicular to said fast scan axis, and said focus axis is substantially parallel to said beam.

31. The system of claim 29, wherein said scan head includes a reflector and an objective lens.

32. The system of claim 31, wherein said reflector is selected from the group consisting of a mirror and a turning prism.

33. A method of scanning comprising:
(a) mounting a polymer array upon a translation stage;
(b) rapidly moving said translation stage along a fast scan axis with a voice coil;

(c) detecting light emitted from the polymer array at different points along the fast scan axis;

(d) moving the polymer array along a slow scan axis; and (e) repeating steps (b), (c) and (d).

34. The method of claim 33, further comprising moving the polymer array along a focus axis.

35. A method of scanning comprising:

(a) mounting a polymer array upon a bracket movable along a slow scan axis;

(b) moving a scanning beam across a surface of the polymer array by rapidly moving a reflector and an objective lens along a fast scan axis with a voice coil;

(c) detecting light emitted from the polymer array at different points along the fast scan axis;

(d) moving the polymer array along the slow scan axis; and (e) repeating steps (b), (c) and (d).

36. The method of claim 35, further comprising moving the polymer array along a focus axis.

37. A scanning system comprising:

a translation stage having a voice coil, a linear slide and a bracket, said bracket connecting said voice coil to said linear slide and having a surface for mounting a polymer array;

a 3-axis translation table coupled to said translation stage and movable along a slow scan axis, along a focus axis, and along a tertiary axis; and a scanner for detecting an image on the polymer array, wherein said voice coil, linear slide and bracket are configured to translate said polymer array at least 2 mm at least ten times per second along a fast scan axis.

38. The system of claim 37, wherein said slow scan axis is substantially perpendicular to said fast scan axis, said focus axis is substantially perpendicular to said fast scan axis and said slow scan axis; and said tertiary axis is parallel to said fast scan axis.

39. The system of claim 37, wherein said voice coil, linear slide and bracket are configured to translate said polymer array at least 5 mm at least 20 times per second along the fast scan axis.

40. The system of claim 37, wherein said voice coil, linear slide and bracket are configured to translate said polymer array at least 14 mm at least 30 times per second along the fast scan axis.

* * * * *

UNITED STATES PATENT AND TRADEMARK OFFICE
CERTIFICATE OF CORRECTION

PATENT NO.    : 6,545,264 B1                                           Page 1 of 1
DATED         : April 8, 2003
INVENTOR(S)   : David Stern It is certified that error appears in the above-identified patent and that said Letters Patent is hereby corrected as shown below:

Column 15,
Line 28, "2" has been replaced with -- 8 --;
Line 65, "12" has been replaced with -- 18 --;

Column 16,
Line 5, "19" has been replaced with -- 17 --.

Signed and Sealed this

Sixteenth Day of December, 2003

JAMES E. ROGAN
*Director of the United States Patent and Trademark Office*